United States Patent
Miller et al.

(10) Patent No.: US 9,827,637 B2
(45) Date of Patent: Nov. 28, 2017

(54) APPARATUS FOR REPAIRING AND IMPROVING STRUCTURAL INTEGRITY OF STORAGE TANKS

(71) Applicant: Forge Tech, Inc., Kemah, TX (US)

(72) Inventors: Michael Lee Miller, Kemah, TX (US); Daniel J. Rybicki, Kemah, TX (US); Mathew A. Rybicki, Kemah, TX (US); Lawrence J. Povse, Kemah, TX (US); Kenneth R. Vejr, Kemah, TX (US); Andre S. Todd, Kemah, TX (US); John M. Griffin, Kemah, TX (US)

(73) Assignee: Forgetech, Inc., Kemah, TX (US)

( * ) Notice: Subject to any disclaimer, the term of this patent is extended or adjusted under 35 U.S.C. 154(b) by 80 days.

(21) Appl. No.: 14/930,570

(22) Filed: Nov. 2, 2015

(65) Prior Publication Data

US 2017/0120400 A1    May 4, 2017

(51) Int. Cl.
| | | |
|---|---|---|
| *B23P 6/04* | (2006.01) | |
| *B65D 90/08* | (2006.01) | |
| *F16L 55/168* | (2006.01) | |
| *B65D 88/42* | (2006.01) | |

(52) U.S. Cl.
CPC ............... *B23P 6/04* (2013.01); *B65D 88/42* (2013.01); *B65D 90/08* (2013.01); *F16L 55/168* (2013.01); *Y10T 137/598* (2015.04)

(58) Field of Classification Search
CPC ....... F16L 55/168; B65D 88/42; B65D 90/08; B65D 90/00; B23P 6/04; Y10T 137/598
USPC ....................................... 138/98, 97
See application file for complete search history.

(56) References Cited

U.S. PATENT DOCUMENTS

| | | | | |
|---|---|---|---|---|
| 6,102,641 A * | 8/2000 | Hildebrandt | .......... | F16B 43/001 138/98 |
| 7,306,851 B2 * | 12/2007 | Panse | ...................... | B29C 73/10 428/160 |
| 7,409,969 B2 * | 8/2008 | Monk et al. | .......... | F16L 55/168 138/97 |
| 7,624,760 B2 * | 12/2009 | Monk et al. | .......... | F16L 55/168 138/97 |
| 8,955,711 B2 * | 2/2015 | Goad | ..................... | B65D 90/04 220/1.6 |

* cited by examiner

Primary Examiner — Kevin Lee
(74) Attorney, Agent, or Firm — Michael G. Smith, Esq.

(57) ABSTRACT

A defect perimeter sealing system that includes a plurality of perimeter base components that are arranged around a defect of a tank, where all of a top of the perimeter base components are encompassed or spanned by compression panels, the plurality of perimeter base components and the compression panels defining a fill zone between the plurality of perimeter base components and the compression panels, and an injected material in the fill zone.

10 Claims, 41 Drawing Sheets

APPARATUS FOR REPAIRING AND IMPROVING STRUCTURAL INTEGRITY OF STORAGE TANKS

RELATED APPLICATIONS

This application claims priority to and benefit of copending U.S. application Ser. No. 13/678,668 filed 16 Nov. 2012 under 35 U.S.C. 120 which claims priority to U.S. Provisional Application Ser. No. 61/582,329 filed 31 Dec. 2011 under 35 U.S.C. 119(e).

FIELD

The present disclosure generally relates to welding apparatus and techniques.

BACKGROUND

Conventional welding techniques and apparatus can include an ignition source, which may ignite combustible materials. An ignition source is particularly dangerous when repairing defects in petroleum product storage tanks. Conventional techniques include arc welding, brazing, adhesives, drill and tap, mechanical fasteners, clamps and polymer patches.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

The detailed description below describes methods and apparatus for repairing and improving structural integrity of storage tanks.

Figure 1:
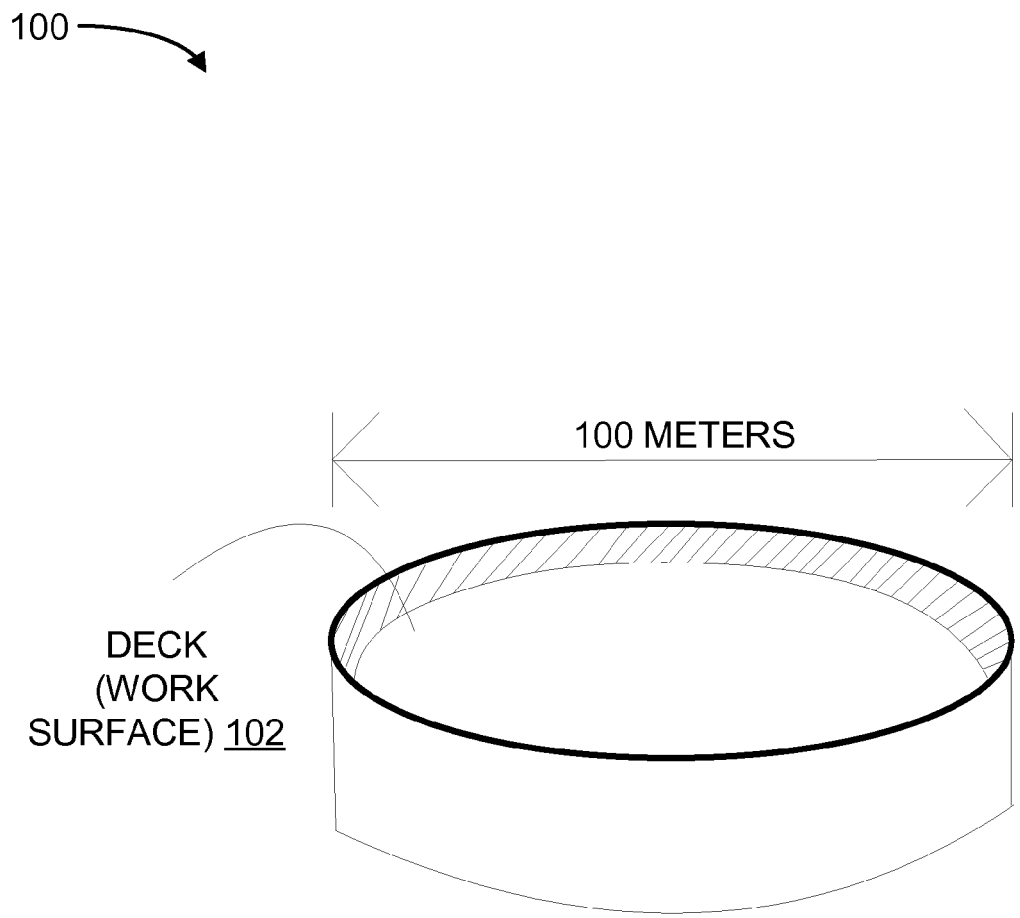
FIG. 1 is an isometric top-side view of a tank having a floating steel roof.

FIG. 1 is an isometric top-side view of a tank 100 having a floating steel roof. Tanks are used to store every known hydrocarbon liquid or gas. The tank 100 includes a deck 102, which is the top of the tank 100. In some implementations, the deck 102 is made of steel and floats above the contents of the tank 100 through floats that are on the bottom of the deck 102. In some implementations, the deck 102 is 3/16 inches of hot rolled steel. Tanks made of steel are exposed to weather, ocean salt and caustic or acidic chemicals which causes corrosion over time.

Tanks are manufactured in many different sizes but in the implementation shown in FIG. 1 tank 100 is 100 meters in diameter.

Figure 2:
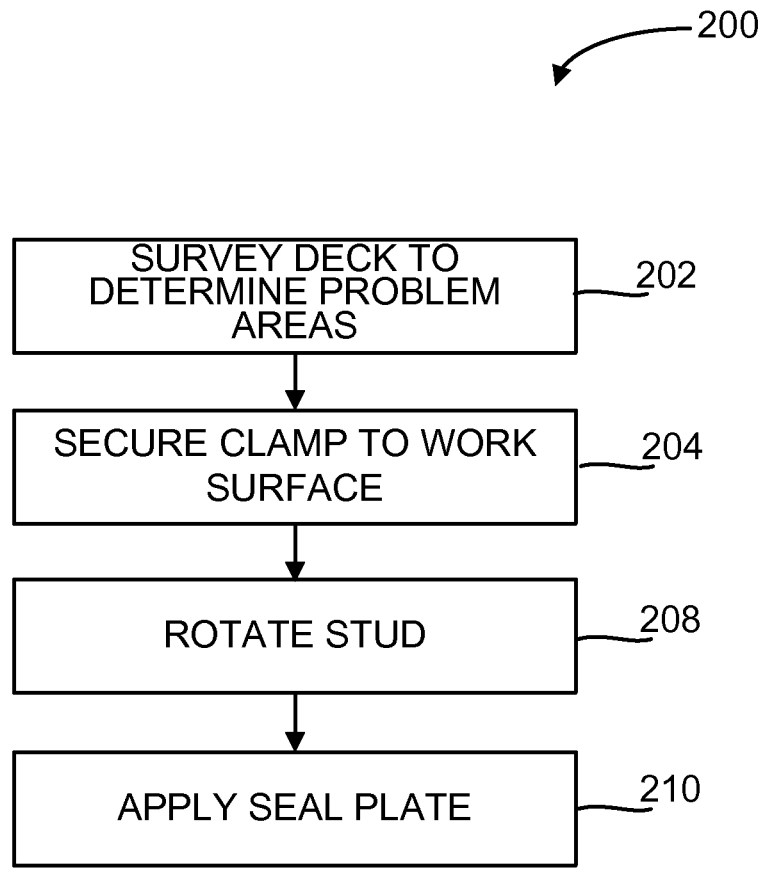
FIG. 2 is a method of a process of tank repair.

FIG. 2 is a method 200 of a process of tank repair. At block 202, method 200 includes surveying a deck of a tank such as deck 102 in FIG. 1 to identify problem and or defect areas on the deck. Thereafter at block 204 method 200 further includes a securing a clamp to the deck in proximity to the problem or defect area to begin repair work on the surface of the deck in the area of the problem or defect area. In some implementations, method 200 includes using the clamp to apply an axial load to a stud. Thereafter at block 208, method 200 includes rotating the stud and at block 210, and at block 210 applying a seal plate to the problem or defect area on the deck. Alternatives to the stud include a threaded boss, or nut, a pass through apparatus, fittings, nozzles, nodes, zerts and nails.

In some implementations of rotating the stud at block 208, rotating the stud further includes rotating the stud until a weld reaches a predetermined temperature, number of rotations, stud link reduction (displacement), time or combination. In some implementations of method 200, method 200 includes deburring the stud after rotating the stud at block 208. In some implementations of applying the seal plate at block 210, compression, injection or a gravity fill seal is used to apply the seal plate.

Advantages of method 200 and other portions of this disclosure include dissimilar metals can be bonded, final strength is greater than either of the two metals used, bonding can be performed in hazardous environments (ie: explosive environments) and portability for ease of use at worksites.

Figure 3:
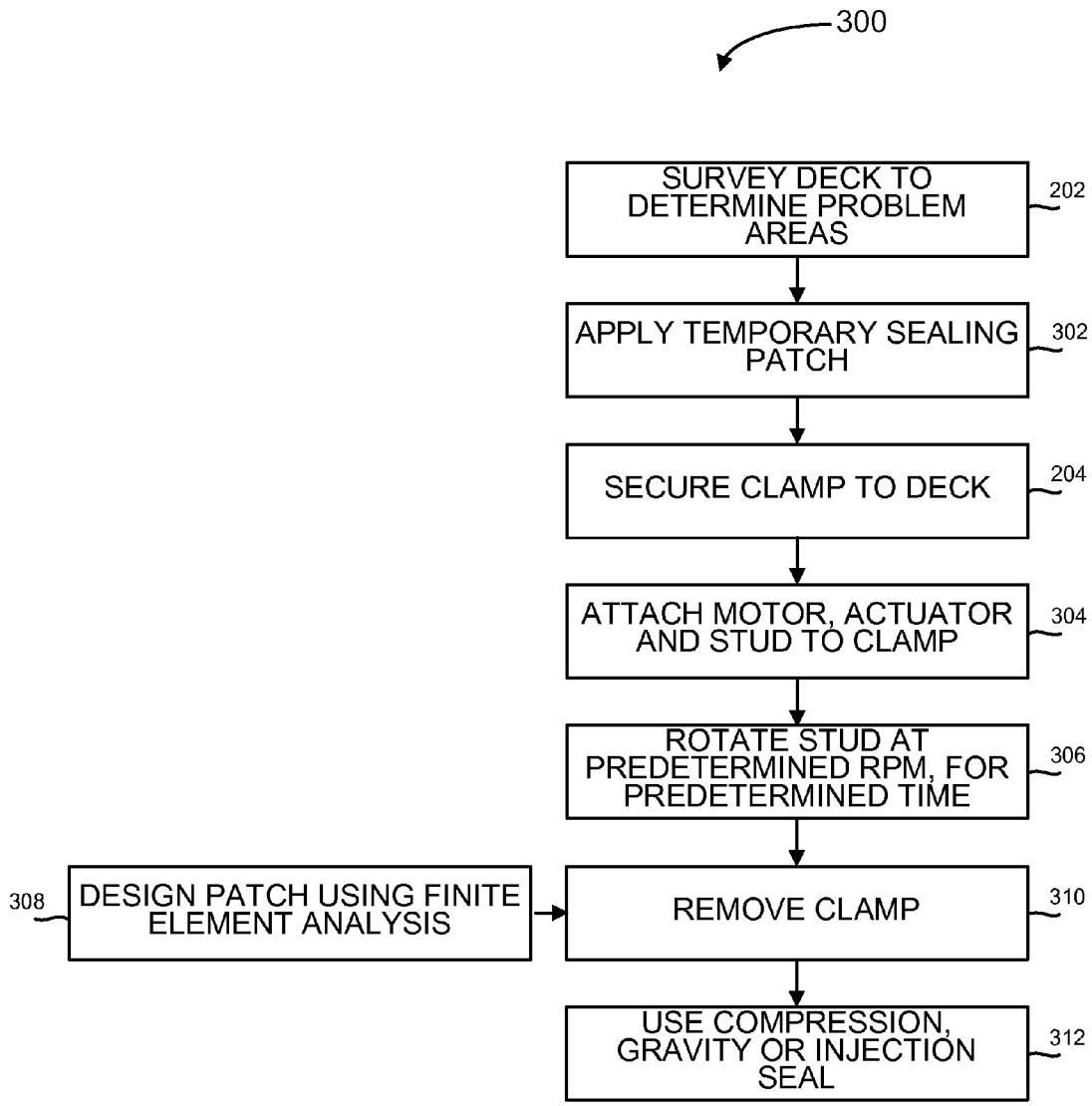
FIG. 3 is a flowchart of a method of a tank repair process.

FIG. 3 is a flowchart of a method 300 of a tank repair process. At block 202, method 300 includes surveying a deck of a tank such as deck 102 in FIG. 1 to identify problem and or defect areas on the deck. At block 302, method 300 includes applying a temporary sealing patch to the identified problem or defect areas. Thereafter at block 204 method 200 further includes a securing a clamp to the deck in proximity to the problem or defect area to begin repair work on the surface of the deck in the area of the problem or defect area. Thereafter at block 304, method 300 includes attaching a motor, an actuator and a stud to the clamp. In some implementation, humans perform the function of the clamp. Some implementations of using the clamp to apply an axial load to a stud includes using the clamp to apply an axial load to a stud. Thereafter at block 306, method 300 includes rotating the stud at a predetermined RPM speed for a predetermined time. At block 308, method 300 also includes designing a patch using finite element analysis. Thereafter, at block 310, method 300 includes removing the clamp, and at block 312, method 300 includes using compression, gravity or an injection seal to apply a seal plate.

Figure 4:
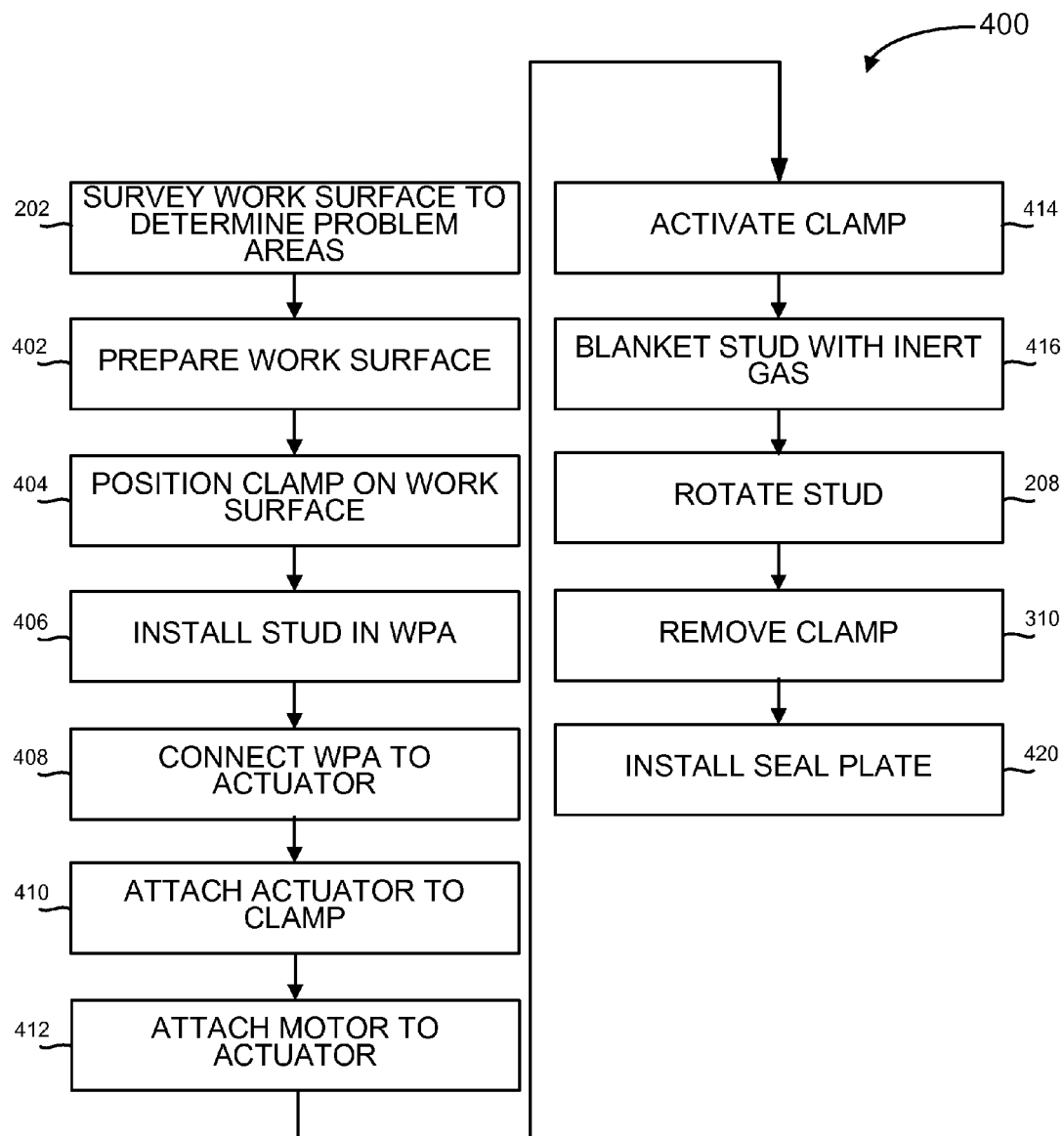
FIG. 4 is a flowchart of a method of a tank repair process.

FIG. 4 is a flowchart of a method 400 of a tank repair process. At block 202 method 400 includes surveying a deck of a tank such as deck 102 in FIG. 1 to identify problem and or defect areas on the deck. At block 302, method 300 includes applying a temporary sealing patch to the identified problem or defect areas. Thereafter, at block 402, method 400 includes preparing a work surface in the vicinity of the identified problem or defect areas.

Thereafter, at block 404, method 400 includes positioning a clamp on the work surface in the vicinity of the identified problem or defect areas. At block 406, method 400 thereafter includes installing a stud in a work piece adapter (WPA). Thereafter at block 408, method 400 includes connecting the WPA to an actuator. Thereafter at block 410, method 400 includes attaching the actuator to a clamp. Thereafter, at block 412, method 400 includes attaching a motor to the actuator. Thereafter, at block 414 method 400 includes activating the clamp. Thereafter at block 416, method 400 includes blanketing the stud with inert gas. In some implementations, method 400 includes pre-loading the stud axially. Thereafter at block 208, method 400 includes rotating the stud and at block 310, method 400 includes removing the clamp, and at block 420 method 400 includes installing a seal plate.

In one particular method, a deck is inspected, surveyed and measured for seal plate dimensions and lay-out. Then leaks and near leaks are identified and temporarily leak sealed prior to preparation of work area. A vacuum clamp is placed over a prepared work area and aligned with intended lay-out or evacuation is performed by a hand pump, a mechanical pump or a simple suction cup design. A work area is cleaned prepared and stud positions are marked. Thereafter, a forging actuator with a pre-loaded stud is inserted into a first work chamber position. Thereafter, an inert atmosphere is created to allow the forging to be accomplished safely. And a required hold down force is generated to allow for the pre-determined load to be applied to the work piece prior to rotation and friction. Thereafter, hydraulics are actuated to achieve pre-determined axial load, and a pneumatic rotational device is locked onto actuator. A controller activates rotation and the friction forge process is sequenced to a timed completion. Actual process is complete in seconds from start to cool-down. The unit can be repositioned to complete the balance of required fasteners in a similar manner. Once all fasteners are completed, the rigid, mechanically attached seal plate is installed. The seal plate can be flexible, such as being a thick rubber gasket with a rigid perimeter bolt plate (akin to a window frame). The method provides both positive containment and improved structural integrity of weakened or distorted decking.

In general various implementations of the seal include compression, gravity fill and injection. Various attachments can be installed to improve existing integrity of storage tank including over-lays and stiffeners.

Figure 5:
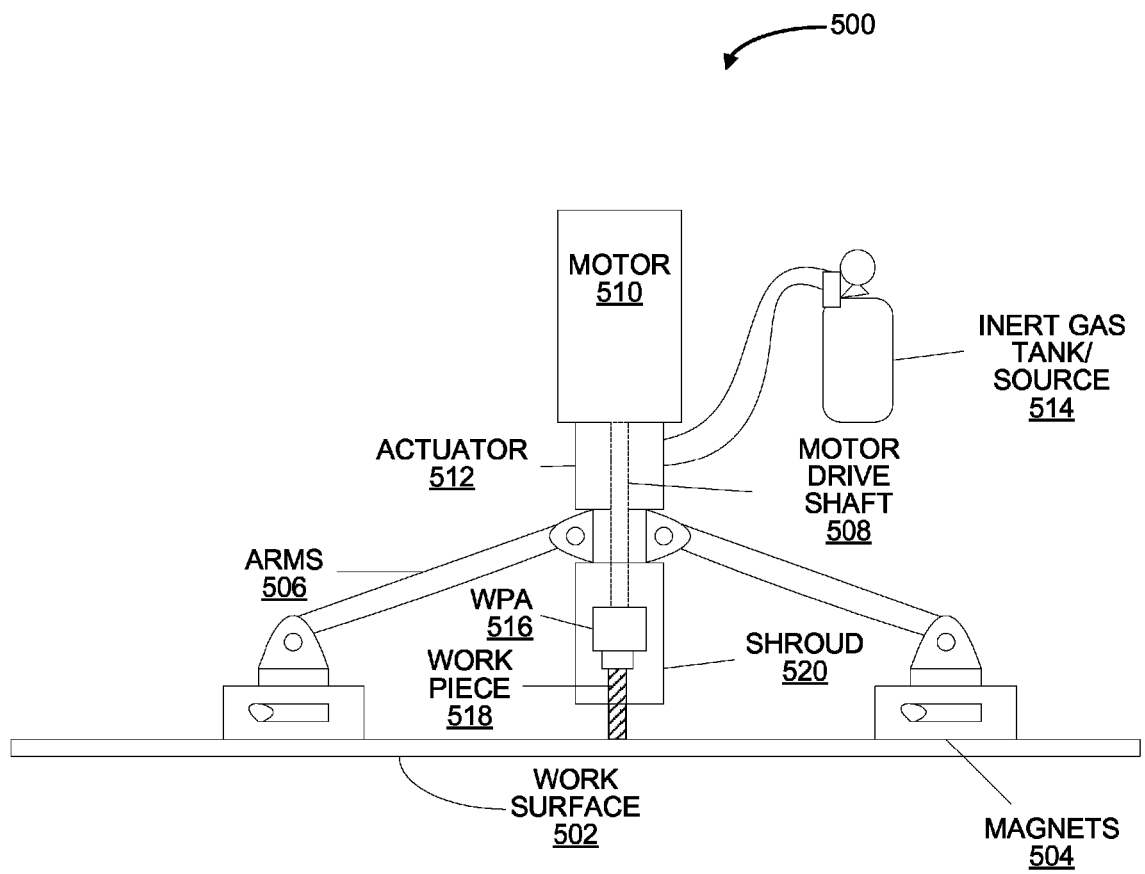
FIG. 5 is a side-view of a block diagram of a friction welding apparatus that uses inert gas.

FIG. 5 is a side-view of a block diagram of a friction welding apparatus 500 that uses inert gas. Friction welding includes inertial welding, solid phase friction welding, ultrasonic welding or rotational friction welding. The friction welding apparatus 500 generates less heat to the extent that combustible materials are not combusted. Examples of the inert gas are nitrogen, argon and helium. The friction welding apparatus 500 is positioned over a work surface 502 such as deck 102 in FIG. 1. The friction welding apparatus 500 includes magnets 504 that are placed in direct contact to the work surface 502. The friction welding apparatus also includes arms 506 that are rotatably attached to the magnets 504 and that are rotatably attached to a body of the friction welding apparatus. The friction welding apparatus 500 also includes a motor drive shaft 508 that is mechanically coupled to a motor 510. In some implementations, the motor 510 is a pneumatic vane motor, or another motor that is made of materials that do not create sparks or an ignition source. Friction welding apparatus 500 also includes an actuator 512 that is removably coupled to an inert gas tank 514. The motor drive shaft 508 is mechanically coupled to a WPA 516, and the WPA is operably coupled to a work piece 518. A shroud 520 encompasses a portion of the work piece 518, the WPA 516 and a lower portion of the motor drive shaft 508. When the inert gas from the inert gas tank 514 is released into the actuator 512, the inert gas flows through the actuator 512 and down to and through the shroud 520 and then out the bottom of the shroud 520, the worksite where the work piece 518 meets the work surface 502 and envelopes the worksite in a non-combustible inert gas thus preventing combustion in the vicinity of the tank.

In regards to all magnet peripheral seals described in the drawings and detailed description herein, a magnet with a peripheral seal can implement an inlet and outlet for injection. As injection occurs, displacement of product will evacuate through the outlet while simultaneously being replaced by sealant when sealant is detected through the outlet. The outlet is closed as long as sealant pressure remains below the holding force of the magnet seal. Various sizes of the outlet are implemented for various needs, which can be straddled with a donut shaped clamp. For mechanical long term repair, a prototype of the magnet can be fairly inexpensive. The motor 510, the actuator 512, the donut shaped clamp and the shroud 520 operate using positive pressure from the inert gas tank 514.

Applications for friction welding of storage tanks include storage tank rooftops, walls and bottoms (floors). Friction welding of storage tanks can performed to repair, improve structural integrity, alter/modify and reconstruct the storage tanks.

Figure 6:
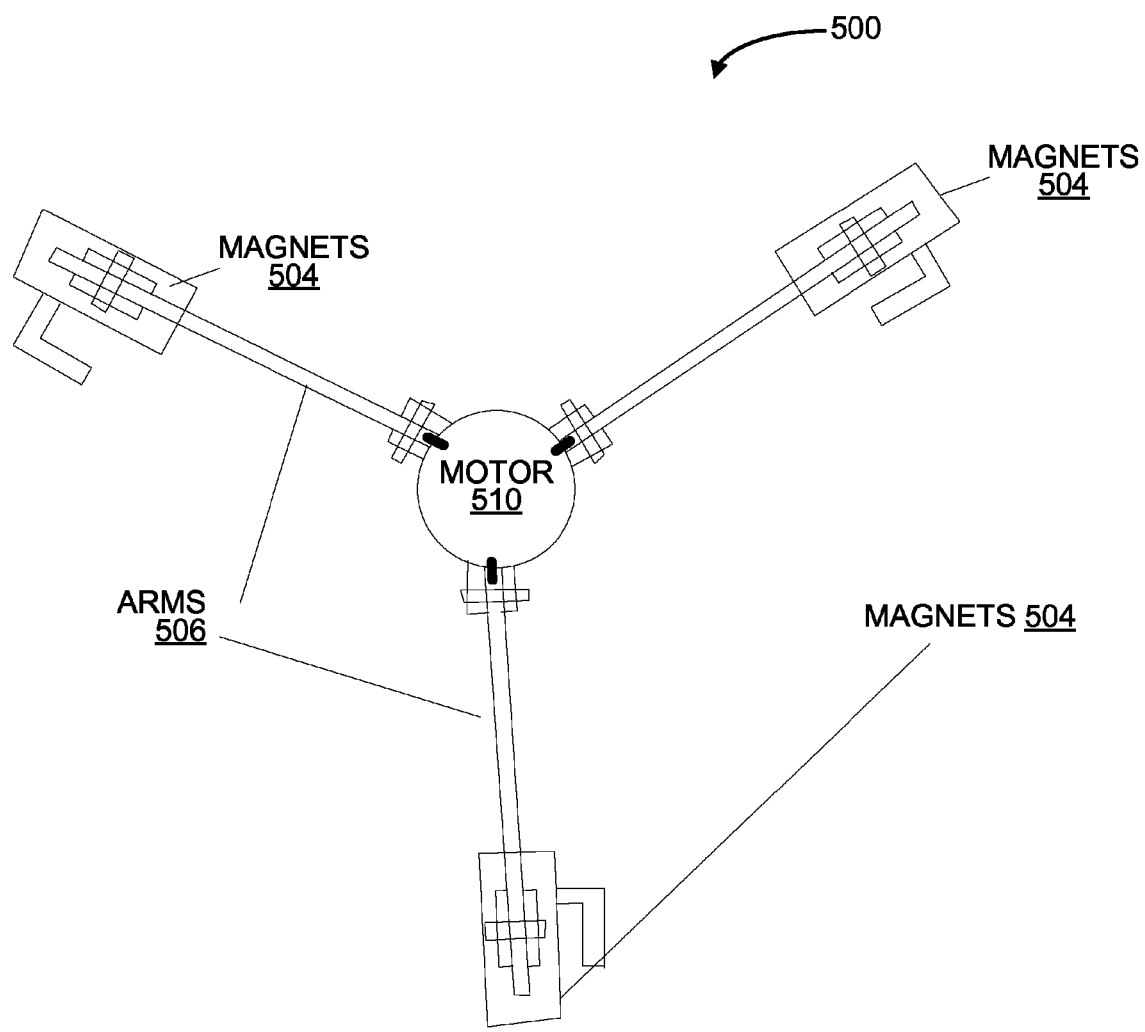
FIG. 6 is a top-view block diagram of a friction welding apparatus that uses inert gas.

FIG. 6 is a top-view block diagram of a friction welding apparatus 500 that uses inert gas. The friction welding apparatus 500 is positioned over a work surface 502 such as deck 102 in FIG. 1. The friction welding apparatus 500 includes magnets 504 that are placed in direct contact to the work surface 502. The friction welding apparatus 500 also includes arms 506 that are rotatably attached to the magnets 504 and that are rotatably attached to a body of the friction welding apparatus. The friction welding apparatus 500 also includes the motor 510.

Figure 7:
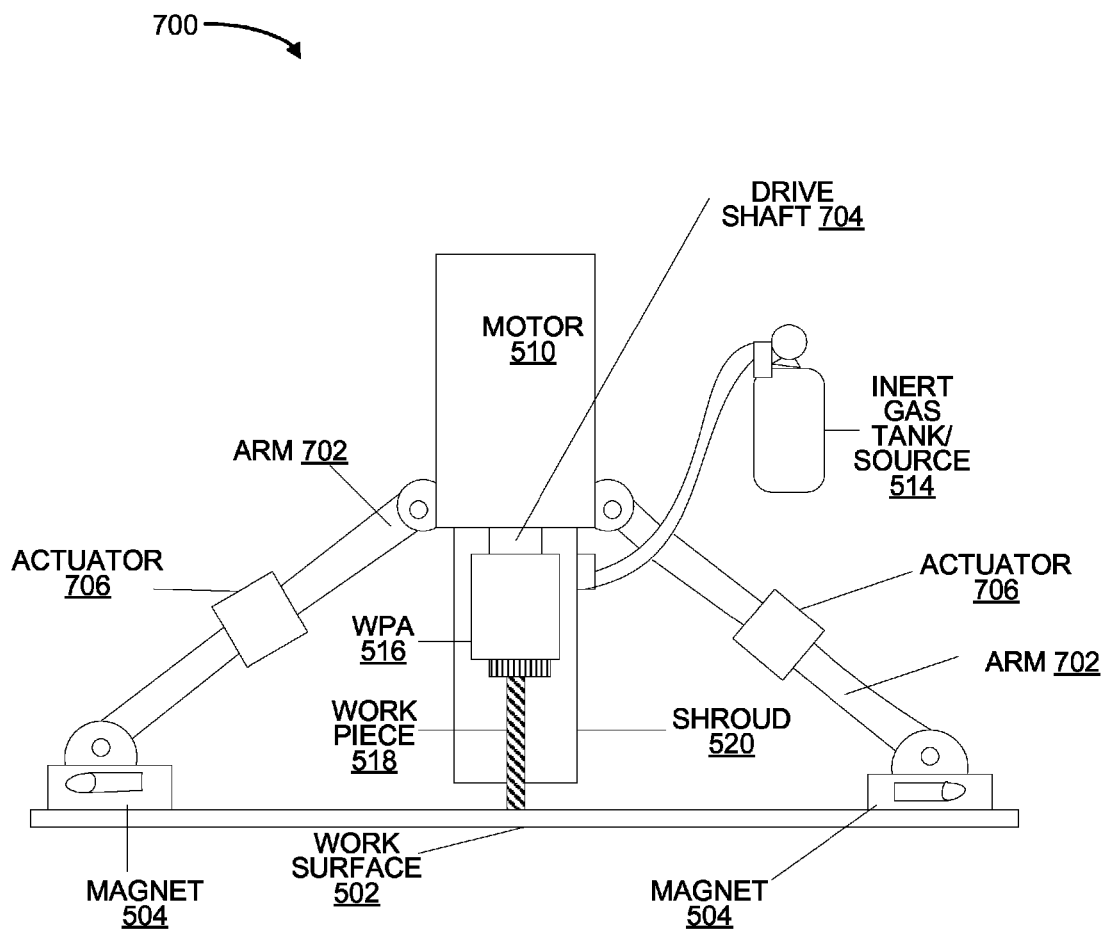
FIG. 7 is a side-view of block diagram of a friction welding apparatus that uses inert gas.

FIG. 7 is a side-view of block diagram of a friction welding apparatus 700 that uses inert gas. The friction welding apparatus 500 generates less heat to the extent that combustible materials are not combusted. Examples of the inert gas are nitrogen, argon and helium. The friction welding apparatus 500 is positioned over a work surface 502 such as deck 102 in FIG. 1. The friction welding apparatus 700 includes magnets 504 that are placed in direct contact to the work surface 502. The friction welding apparatus 700 also includes arms 702 that are rotatably attached to the magnets 504 and that are rotatably attached to a body of the friction welding apparatus 700. The friction welding apparatus 700 also includes a drive motor shaft 704 that is mechanically coupled to motor 510. Friction welding apparatus 700 also includes actuators 706 that is removably coupled to inert gas tank 514. The drive motor shaft 704 is mechanically coupled to a WPA 516, and the WPA is operably coupled to a work piece 518. Shroud 520 encompasses an upper portion of the work piece 518, the WPA 516 and a lower portion of the drive motor shaft 704. When the inert gas from the inert gas tank 514 is released, the inert gas flows down to and through the shroud 520 and then out the bottom of the shroud 520, the worksite where the work piece 518 meets the work surface 502 and envelopes the worksite in a non-combustible inert gas thus preventing combustion in the vicinity of the tank.

Figure 8:
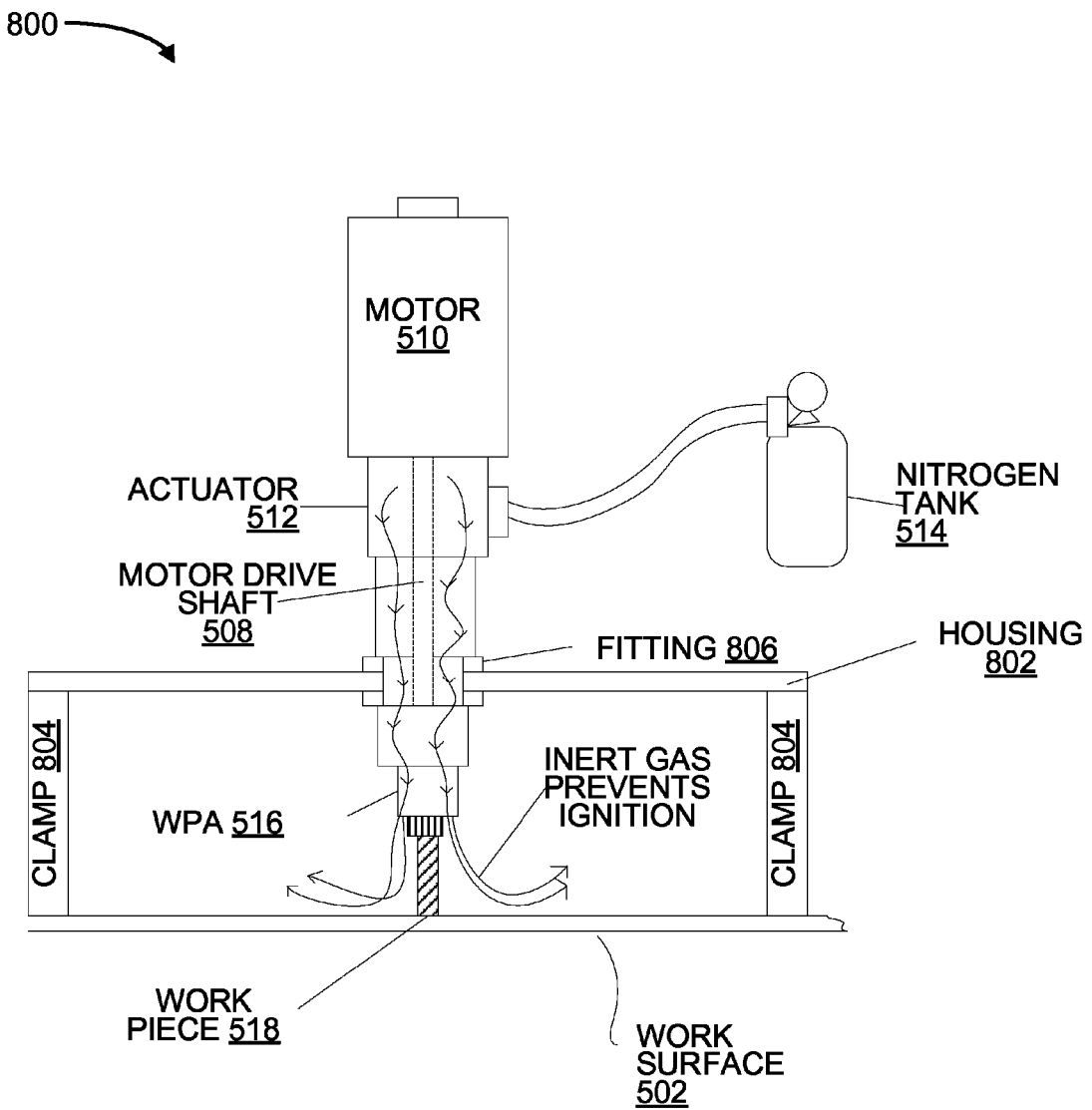
FIG. 8 is a side-view of a block diagram of a friction welding apparatus that uses inert gas.

FIG. 8 is a side-view of a block diagram of a friction welding apparatus 800 that uses inert gas. The friction welding apparatus 800 generates less heat to the extent that combustible materials are not combusted. Examples of the inert gas are nitrogen, argon and helium. The friction welding apparatus 800 is positioned over a work surface 502 such as deck 102 in FIG. 1. The friction welding apparatus 800 includes a housing 802 that is secured to the work surface 502 through a number of clamps 804. A fitting 806 provides a substantially air tight seal between the housing 802 and the actuator 512. Indeed, the housing 802, the clamps 804 and the fitting 806 provide a substantially air tight seal with the work surface 502. The substantially air tight seal is not completely airtight but in fact provides deminimus passage of gas out of the enclosure formed by the housing 802, the clamps 804, fitting 806 and the work surface 502. The friction welding apparatus 800 also includes a motor drive shaft 508 that is mechanically coupled to motor 510. Friction welding apparatus 800 also includes an actuator 512 that is removably coupled to an inert gas tank 514. The motor drive shaft 508 is mechanically coupled to a WPA 516, and the WPA is operably coupled to a work piece 518. When the inert gas from the inert gas tank 514 is released into the actuator 512, the inert gas flows through the actuator 512 and down into the enclosure, thus enveloping. The worksite in a non-combustible inert gas thus preventing combustion in the vicinity of the tank.

Figure 9A:
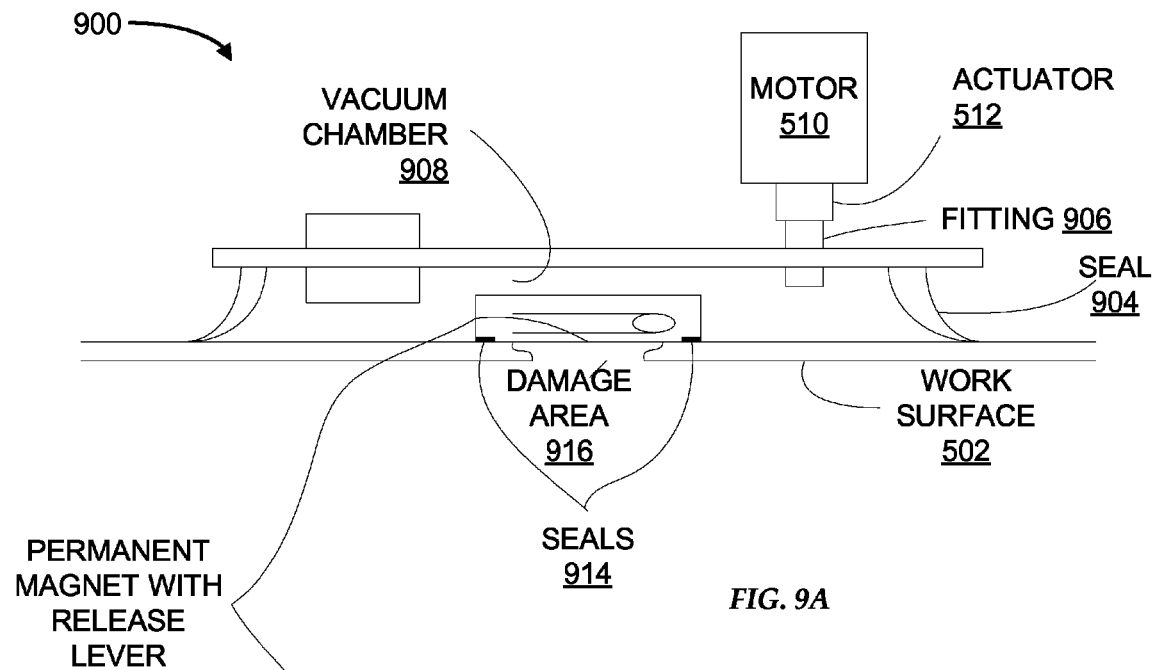
FIG. 9A is a side-view of a block diagram of a friction welding apparatus that uses a vacuum chamber formed from a flexible seal; a housing and a magnetic apparatus.

FIG. 9A is a side-view of a block diagram of a friction welding apparatus 900 that uses a vacuum chamber formed from a flexible seal, a housing and a magnetic apparatus. The vacuum prevents combustion of combustible materials. The friction welding apparatus 900 is positioned over a work surface 502 such as deck 102 in FIG. 1. The friction welding apparatus 900 includes a housing 902 that is secured to the work surface 502 through a flexible seal 904. A fitting 906 provides a substantially air tight seal between the housing 902 and actuator 512. The housing 902 and the fitting 906 provide a substantially air tight seal with the work surface 502. The friction welding apparatus 900 also includes motor 510. The housing 902, the fitting 906 and the work surface 502 form a vacuum chamber 908 which prevents combustion in the vicinity of the tank. The friction welding apparatus 900 also includes a permanent magnet 910 the permanent magnet 910 including a release lever 912. The permanent magnet 910 is placed over seals 914 that encompass the perimeter of the damaged area 916.

Figure 9B:
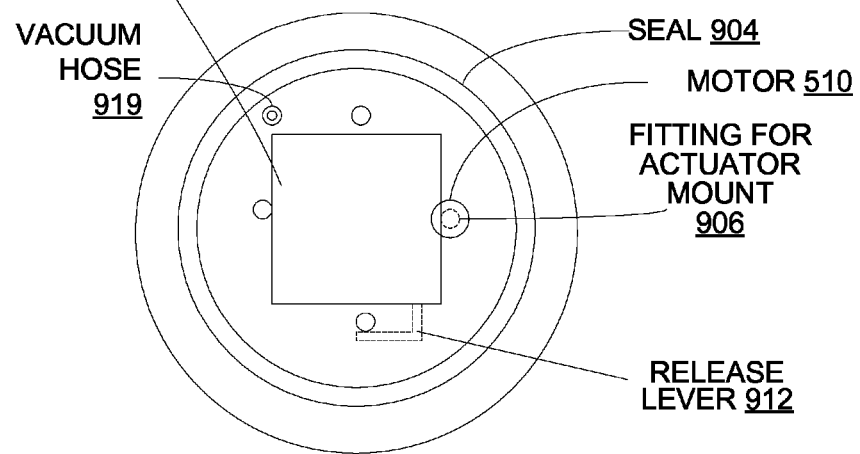
FIG. 9B is a top-view of a block diagram of a friction welding apparatus that uses a vacuum formed from a flexible seal; a housing and a magnetic apparatus.

FIG. 9B is a top-view of a block diagram of a friction welding apparatus 900 that uses a vacuum formed from a flexible seal, a housing and a magnetic apparatus. The housing 902 of the friction welding apparatus 900 includes a hole 917 and a fitting 918 through the housing 902 through which a vacuum hose 919 attaches.

Figure 10:
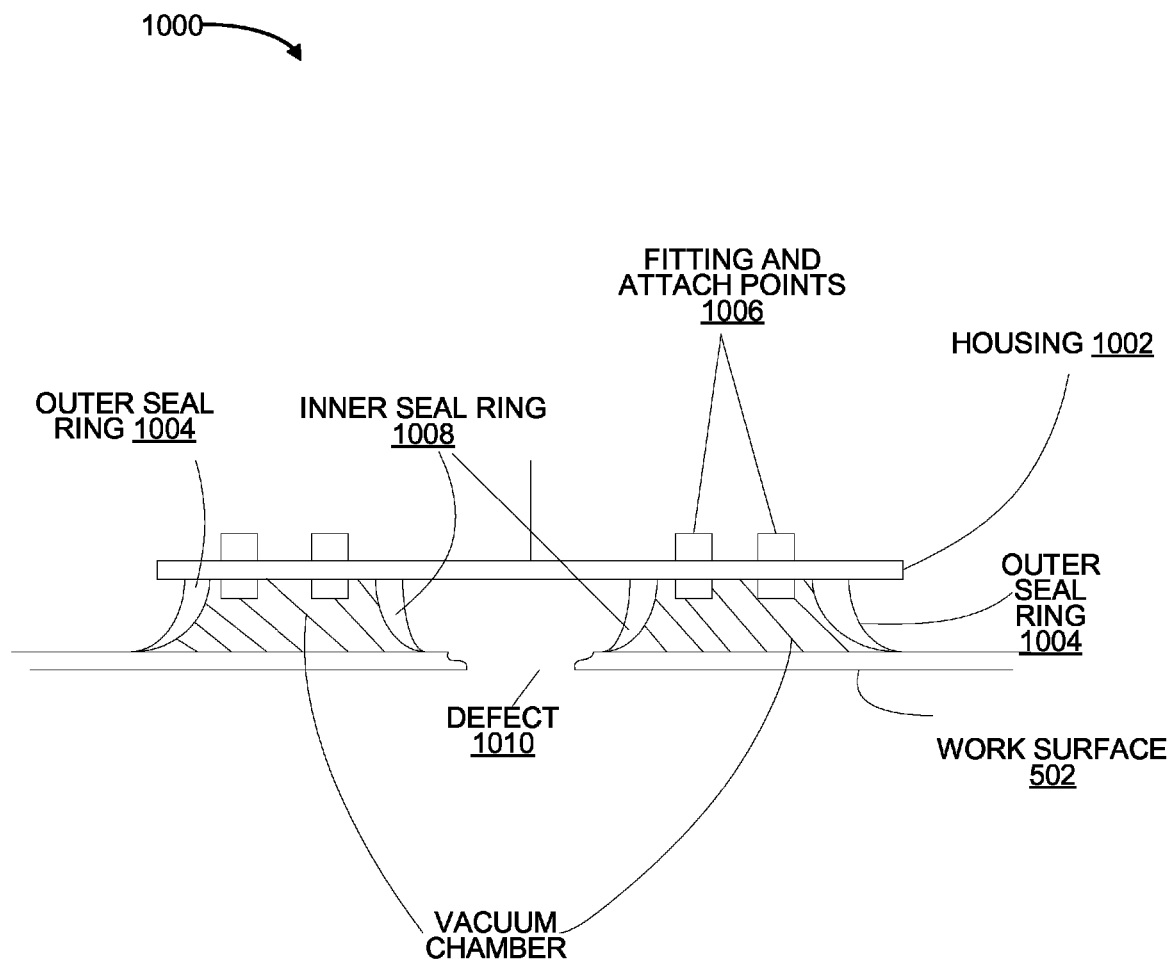
FIG. 10 is a side-view of a block diagram of a friction welding apparatus that uses a vacuum chamber formed from a flexible outer seal; a housing and a flexible inner seal.

FIG. 10 is a side-view of a block diagram of a friction welding apparatus 1000 that uses a vacuum chamber formed from a flexible outer seal, a housing and a flexible inner seal. The vacuum prevents combustion of combustible materials. The friction welding apparatus 1000 is positioned over a work surface 502 such as deck 102 in FIG. 1. The friction welding apparatus 1000 includes a housing 1002 that is secured to the work surface 502 through a flexible outer seal ring 1004. Fitting and attach points 1006 provide a substantially air tight seal between the housing 1002 and actuator. The friction welding apparatus 1000 also includes flexible inner seal ring 1008 that encompass the problem or defect area 1010 in the work surface. The housing 1002, outer seal rings 1004, fitting and attach points 1006 and the inner seal ring 1008 provide a substantially air tight seal around the work surface 502. The housing 1002, the outer seal ring 1004, the fitting and attach points 1006, the inner seal ring 1008 and the work surface 502 create a vacuum chamber which prevents combustion in the vicinity of the tank.

Figure 11:
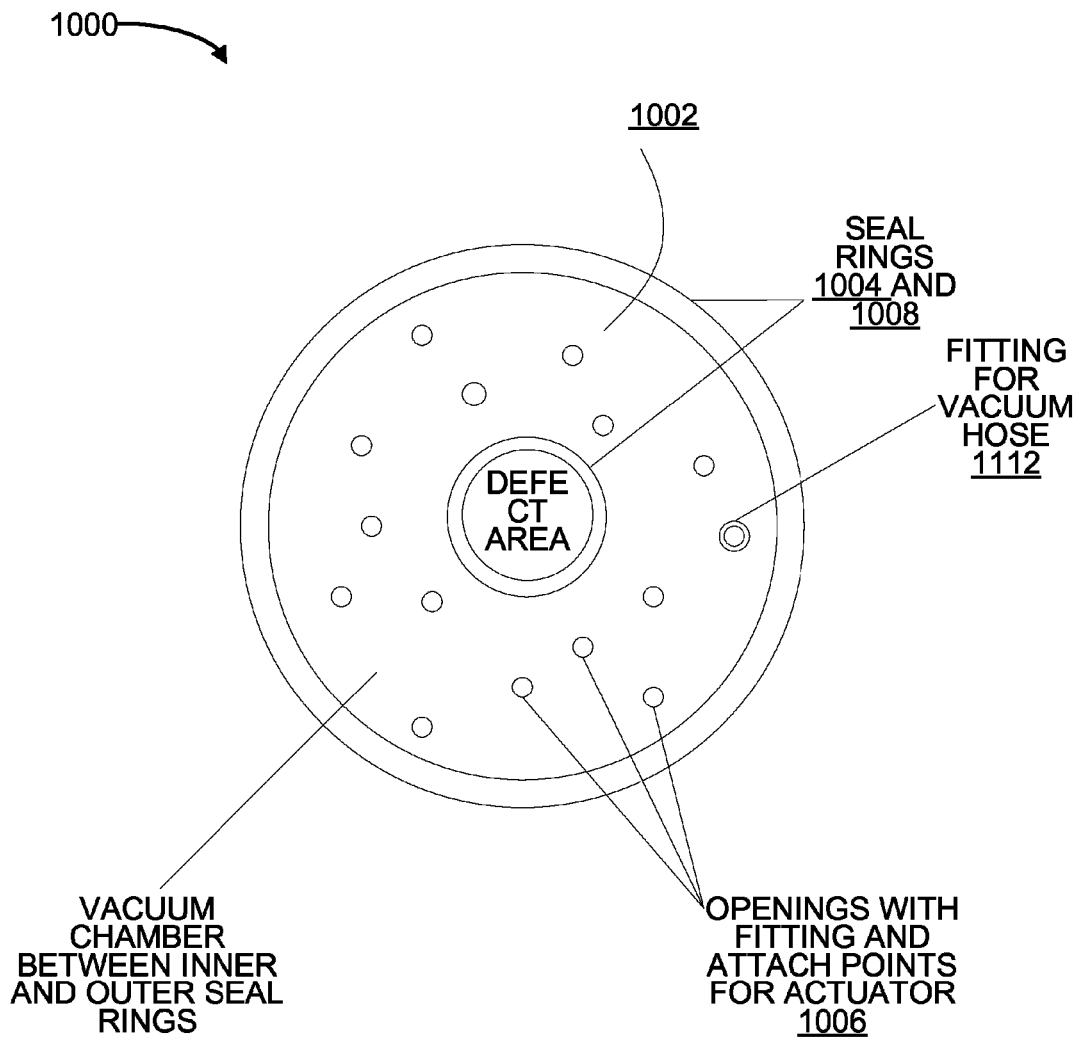
FIG. 11 is a top-view of a block diagram of a friction welding apparatus that uses a vacuum formed from flexible seals and a housing.

FIG. 11 is a top-view of a block diagram of a friction welding apparatus 1000 that uses a vacuum formed from flexible seals and a housing. The housing 1002 of the friction welding apparatus 1000 includes a hole 1112 through the housing through which a vacuum hose attaches.

Figure 12:
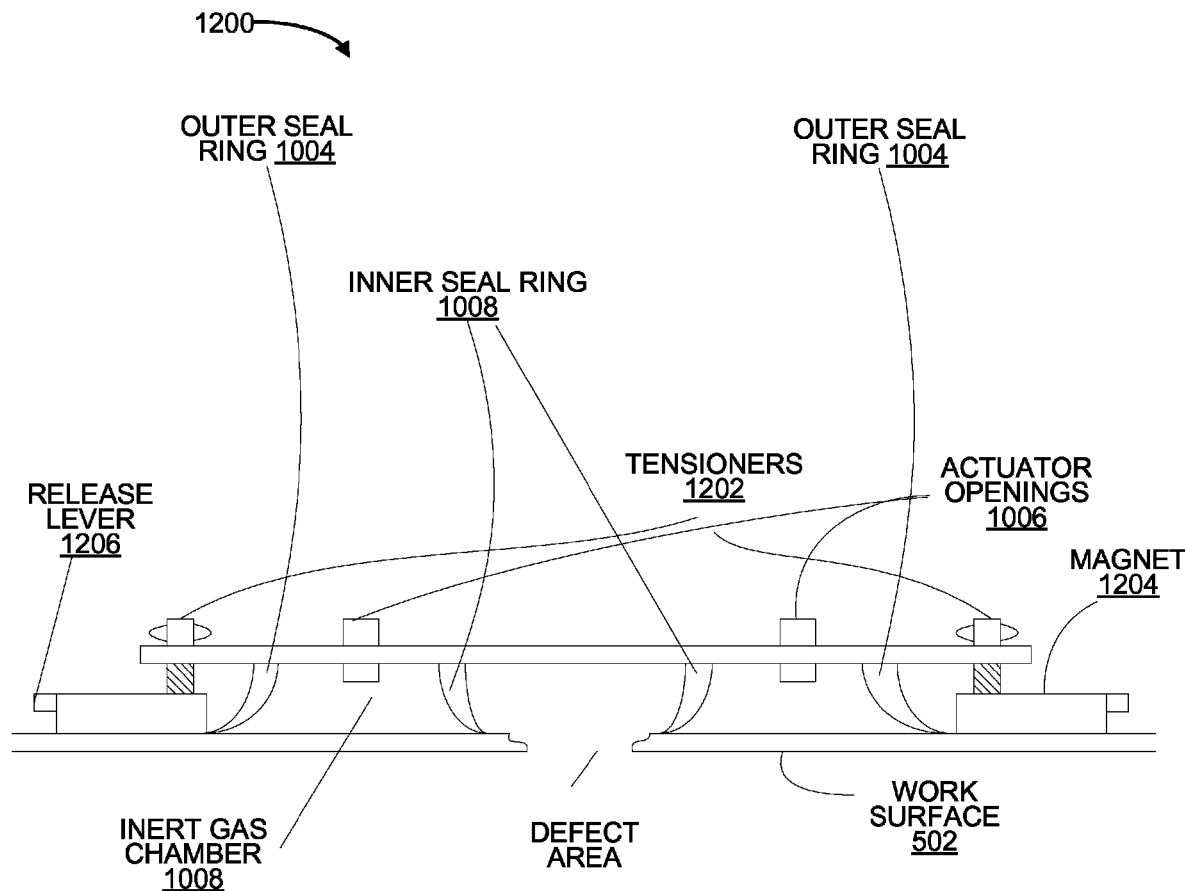
FIG. 12 is a side-view of a block diagram of a friction welding apparatus that uses an inert gas chamber formed from a flexible outer seal; a housing and a flexible inner seal.

FIG. 12 is a side-view of a block diagram of a friction welding apparatus 1200 that uses an inert gas chamber formed from a flexible outer seal, a housing and a flexible inner seal. The vacuum prevents combustion of combustible materials. The friction welding apparatus 1200 is positioned over a work surface 502 such as deck 102 in FIG. 1. The friction welding apparatus 1200 includes a housing 1002 that is secured to the work surface 502 through a flexible outer seal ring 1004. Fitting and attach points 1006 provide a substantially air tight seal between the housing 1002 and actuator. The friction welding apparatus 1200 also includes flexible inner seal ring 1008 that encompass the problem or defect area 1010 in the work surface. The housing 1002, the outer seal ring 1004, the fitting and attach points 1006 and the inner seal ring 1008 provide a substantially air tight seal around the work surface 502. The substantially air tight seal is not completely airtight but in fact provides de-minimus passage of gas out of the enclosure formed by the housing 1002, the outer seal ring 1004, the fitting, the attach points 1006, the inner seal ring 1008 and the work surface 502. The housing 1002, the outer seal ring 1004, the fitting and attach points 1006, the inner seal ring 1008 and the work surface 502 create a vacuum which prevents combustion in the vicinity of the tank. Friction welding apparatus 1200 also includes tensioners 1202 that pass through the housing 1002 and are mechanically and rotatably attached to magnets 1204 that are magnetically attached to the work surface 502. The magnets 1204 include a release lever 1206 that releases the magnet 1204 from the work surface 502.

Figure 13:
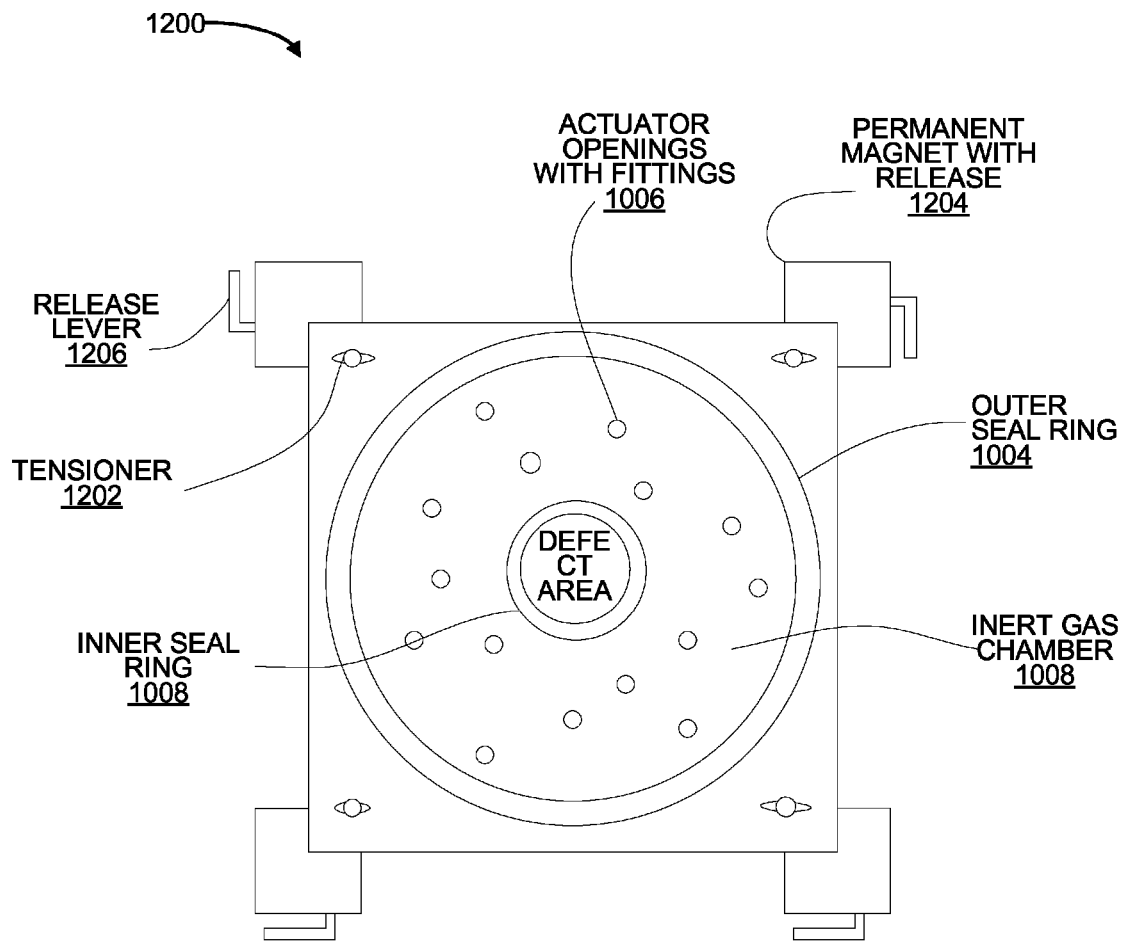
FIG. 13 is a top-view of a block diagram of a friction welding apparatus that uses a vacuum formed from flexible seals and a housing.

FIG. 13 is a top-view of a block diagram of a friction welding apparatus 1200 that uses a vacuum formed from flexible seals and a housing. The housing 1002 of the friction welding apparatus 1200 includes a hole 1112 through the housing through which a vacuum hose attaches.

Figure 14:
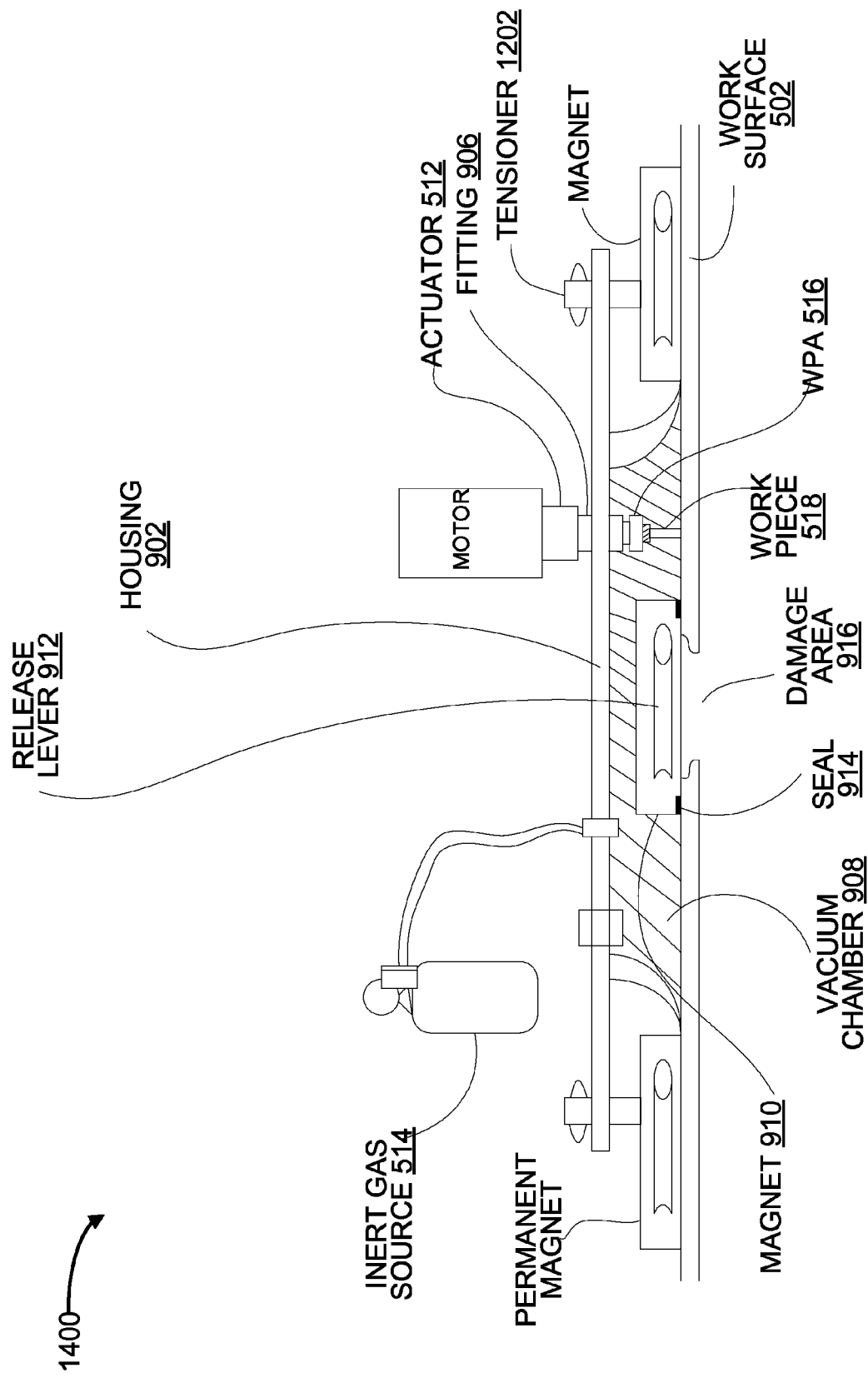
FIG. 14 is a side-view of a block diagram of a friction welding apparatus that uses a chamber of inert gas formed from a flexible seal; a housing and a magnetic apparatus.

FIG. 14 is a side-view of a block diagram of a friction welding apparatus 1400 that uses a chamber of inert gas formed from a flexible seal, a housing and a magnetic apparatus. The chamber of insert gas prevents combustion of combustible materials. The friction welding apparatus 1400 is positioned over a work surface 502 such as deck 102 in FIG. 1. The friction welding apparatus 1400 includes a housing 902 that is secured to the work surface 502 through a flexible seal 904. A fitting 906 provides a substantially air tight seal between the housing 902 and actuator 512. The housing 902 and the fitting 906 provide a substantially air tight seal with the work surface 502. The substantially air tight seal is not completely airtight but in fact provides de-minimus passage of gas out of the enclosure formed by the housing 902, the fitting 906 and the work surface 502. The friction welding apparatus 1400 also includes motor 510. Unused fittings in the housing 902 are fitted with caps to prevent pressure equalization in the vacuum chamber 908. The housing 902, the fitting 906 and the work surface 502 form a vacuum chamber 908 that is filled by inert gas from inert gas tank 514 which prevents combustion in the vicinity of the tank. The friction welding apparatus 1400 also includes a permanent magnet 910 the permanent magnet 910 including a release lever 912. The permanent magnet 910 is placed over seals 914 that encompass the problem or the damaged area 916. Friction welding apparatus 1400 also includes tensioners 1202 that pass through the housing 902 and are mechanically and rotatably attached to magnets 1204 that are magnetically attached to the work surface 502. The magnets 1204 include a release lever 1206 that releases the magnet 1204 from the work surface 502.

Figure 15:
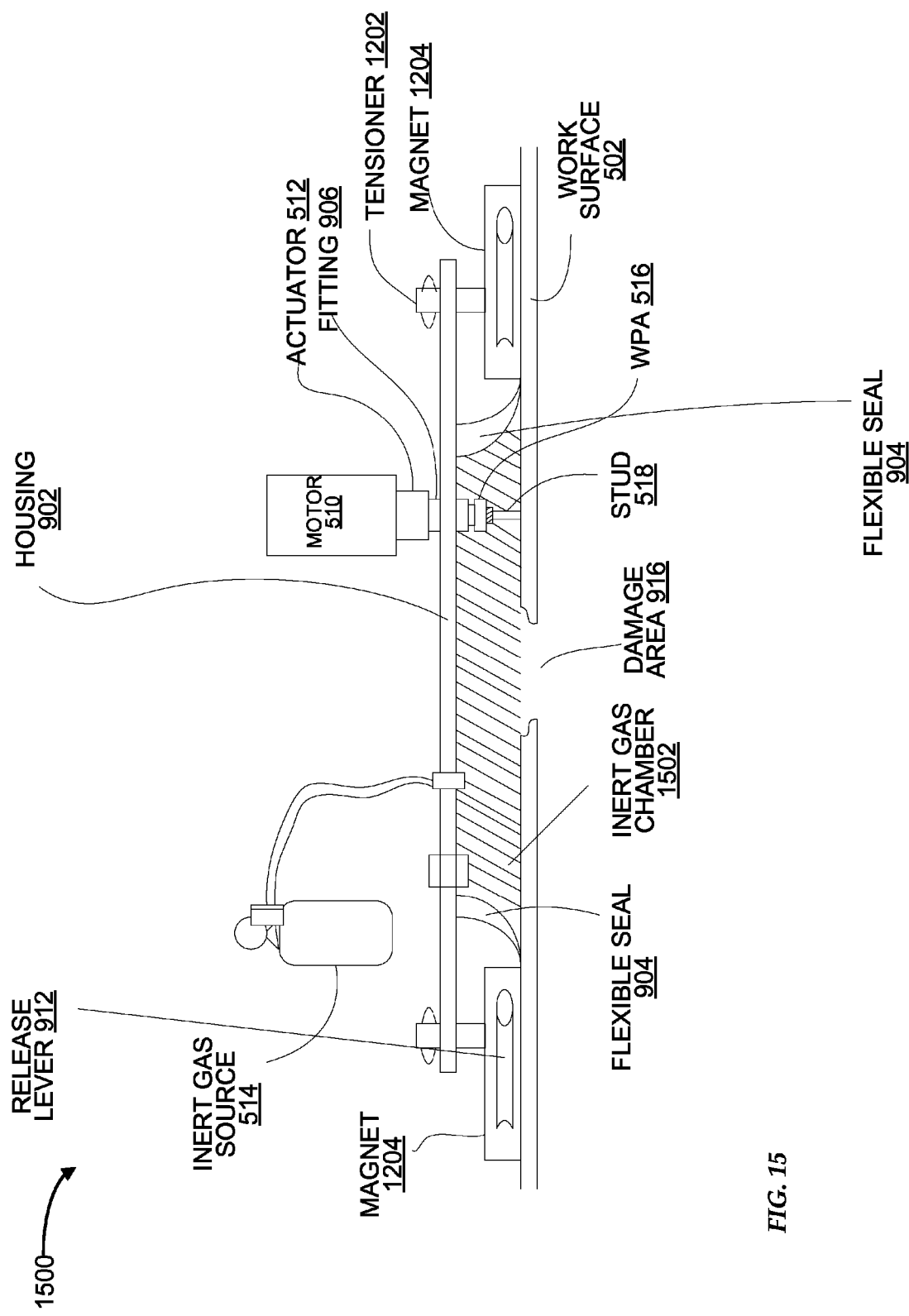
FIG. 15 is a side-view of a block diagram of a friction welding apparatus that uses a chamber of inert gas formed from a flexible seal; a housing and a magnetic apparatus.

FIG. 15 is a side-view of a block diagram of a friction welding apparatus 1500 that uses a chamber of inert gas formed from a flexible seal, a housing and a magnetic apparatus. The chamber of insert gas prevents combustion of combustible materials. The friction welding apparatus 1500 is positioned over a work surface 502 such as deck 102 in FIG. 1. The friction welding apparatus 1500 includes a housing 902 that is secured to the work surface 502 through a flexible seal 904. A fitting 906 provides a substantially air tight seal between the housing 902 and actuator 512. The housing 902, flexible seal 904 and the fitting 906 provide a substantially air tight seal with the work surface 502. The substantially air tight seal is not completely airtight but in fact provides deminimus passage of gas out of the chamber 1502 formed by the housing 902, the flexible seal 904, the fitting 906 and the work surface 502. The friction welding apparatus 1500 also includes motor 510. The housing 902, the fitting 906 and the work surface 502 form the chamber 1502 that is filled by inert gas from inert gas tank 514 which prevents combustion in the vicinity of the tank. Friction welding apparatus 1500 also include tensioners 1202 that pass through the housing 902 and are mechanically and rotatably attached to magnets 1204 that are magnetically attached to the work surface 502. The magnets 1204 include a release lever 1206 that releases the magnet 1204 from the work surface 502.

Figure 16:
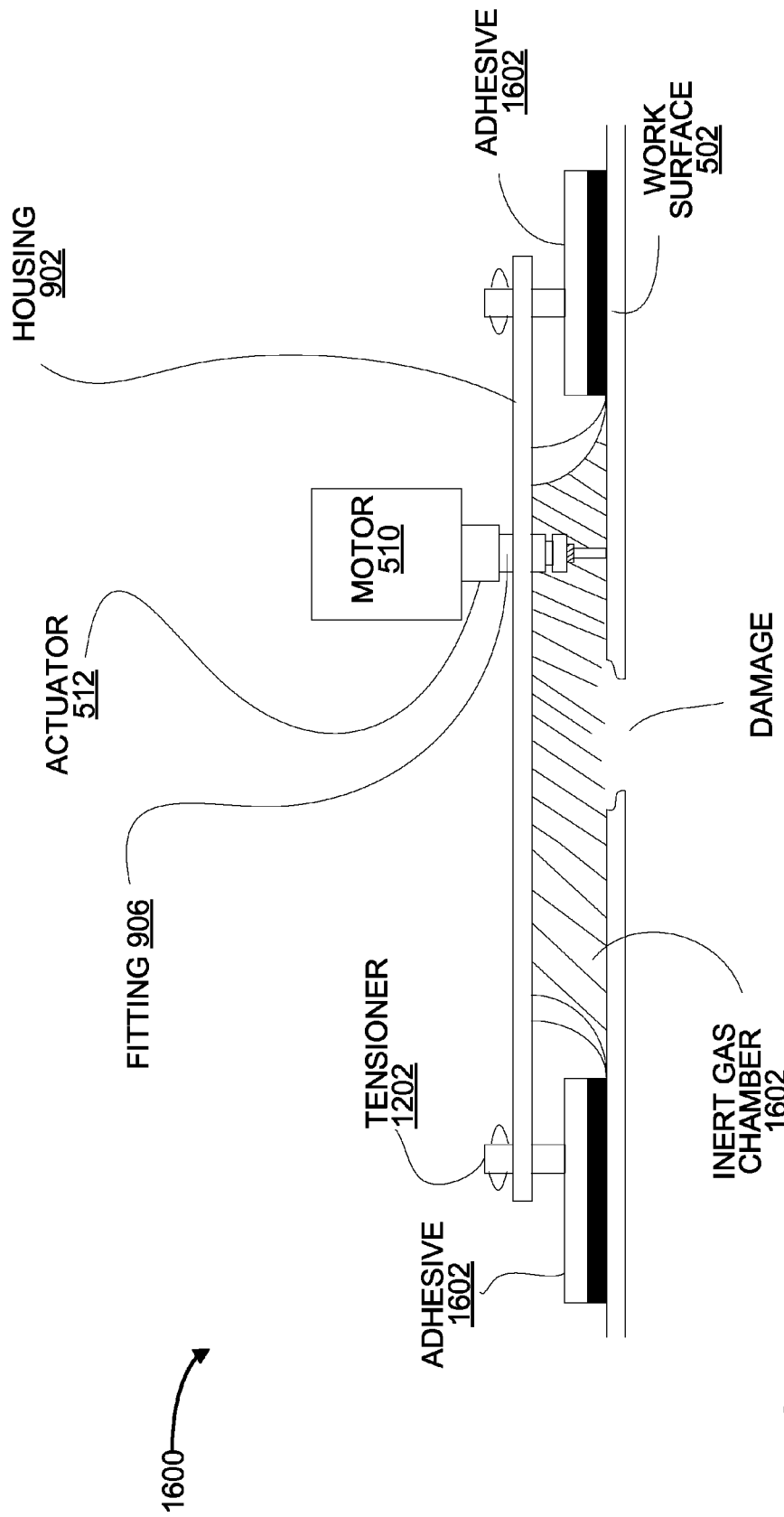
FIG. 16 is a side-view of a block diagram of a friction welding apparatus that uses a chamber of inert gas formed from a flexible seal; a housing and an adhesive apparatus.

FIG. 16 is a side-view of a block diagram of a friction welding apparatus 1600 that uses a chamber of inert gas formed from a flexible seal, a housing and an adhesive apparatus. The chamber of inert gas prevents combustion of combustible materials. The friction welding apparatus 1600 is positioned over a work surface 502 such as deck 102 in FIG. 1. The friction welding apparatus 1600 includes a housing 902 that is secured to the work surface 502 through a flexible seal 904. A fitting 906 provides a substantially air tight seal between the housing 902 and actuator 512. The friction welding apparatus 1600 also includes motor 510. The housing 902, the fitting 906 and the work surface 502 form a chamber 1602 that is filled by inert gas. Friction welding apparatus 1600 also include tensioners 1202 that pass through the housing 902 and are attached to the work surface 502 via adhesive.

Figure 17:
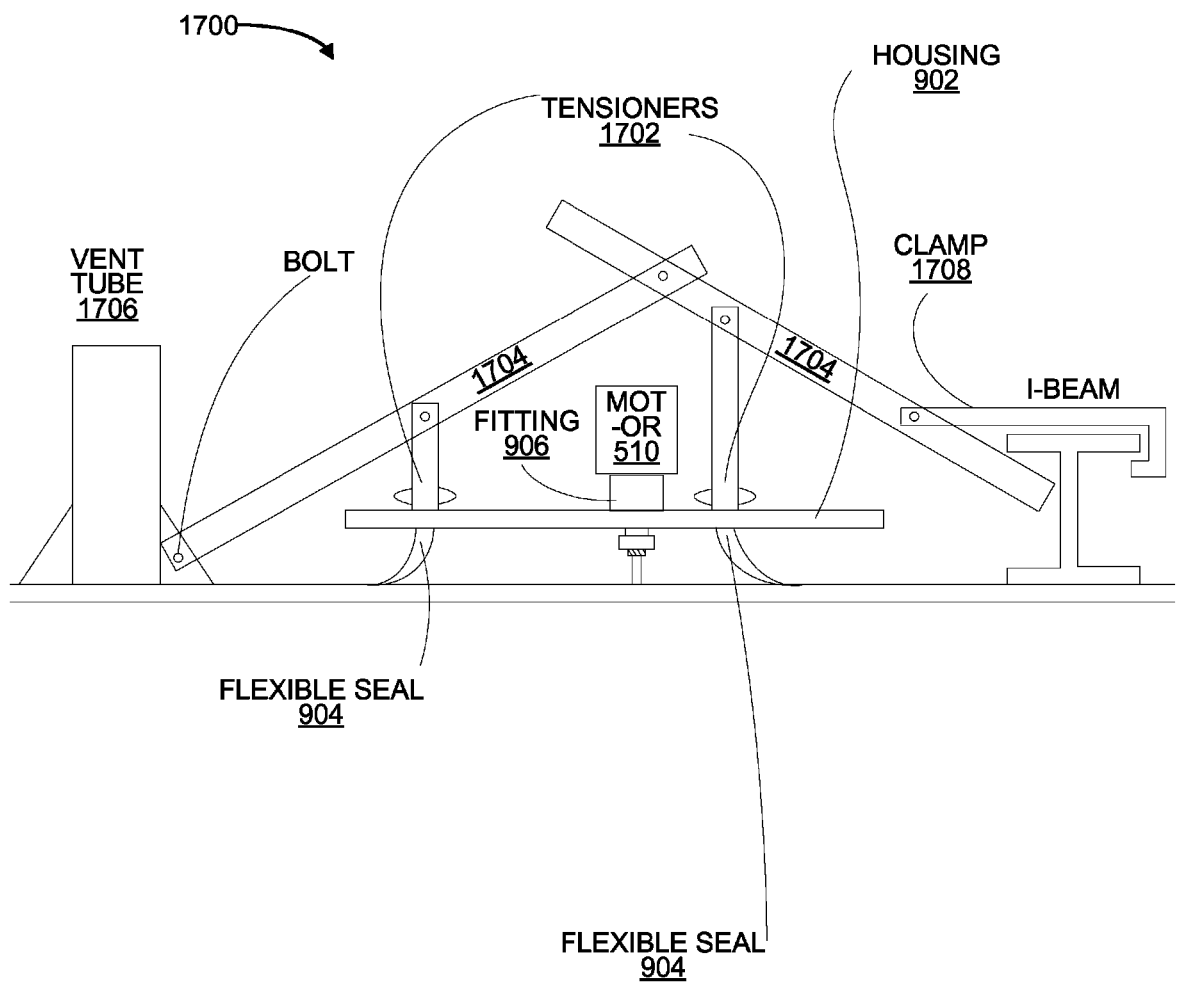
FIG. 17 is a side-view of a block diagram of a friction welding apparatus that uses wing-nut tensioners and levers.

FIG. 17 is a side-view of a block diagram of a friction welding apparatus 1700 that uses wing-nut tensioners and levers. The friction welding apparatus 1700 is positioned over a work surface 502 such as deck 102 in FIG. 1. The friction welding apparatus 1700 includes a housing 902 that is secured to the work surface 502 through a flexible seal 904. A fitting 906 provides a substantially air tight seal between the housing 902 and motor 510. The substantially air tight seal is not completely airtight but in fact provides de-minimus passage of gas out of the enclosure formed by the housing 902, the fitting 906 and the work surface 502. The housing 902, the fitting 906 and the work surface 502 form a vacuum chamber 908 which prevents combustion in the vicinity of the tank. The friction welding apparatus 1700 also includes wing-nut tensioners 1702 that are operably coupled to arms 1704. When the wingnut tensioners 1702 are turned, the tensioners 1702 either increase or decrease tension on the housing 902, depending upon which direction the tensioners 1702 are turned. The arms 1704 are rotatably attached to each other and to stationary items, such as vent tube 1706 and clamp 1708.

Figure 18:
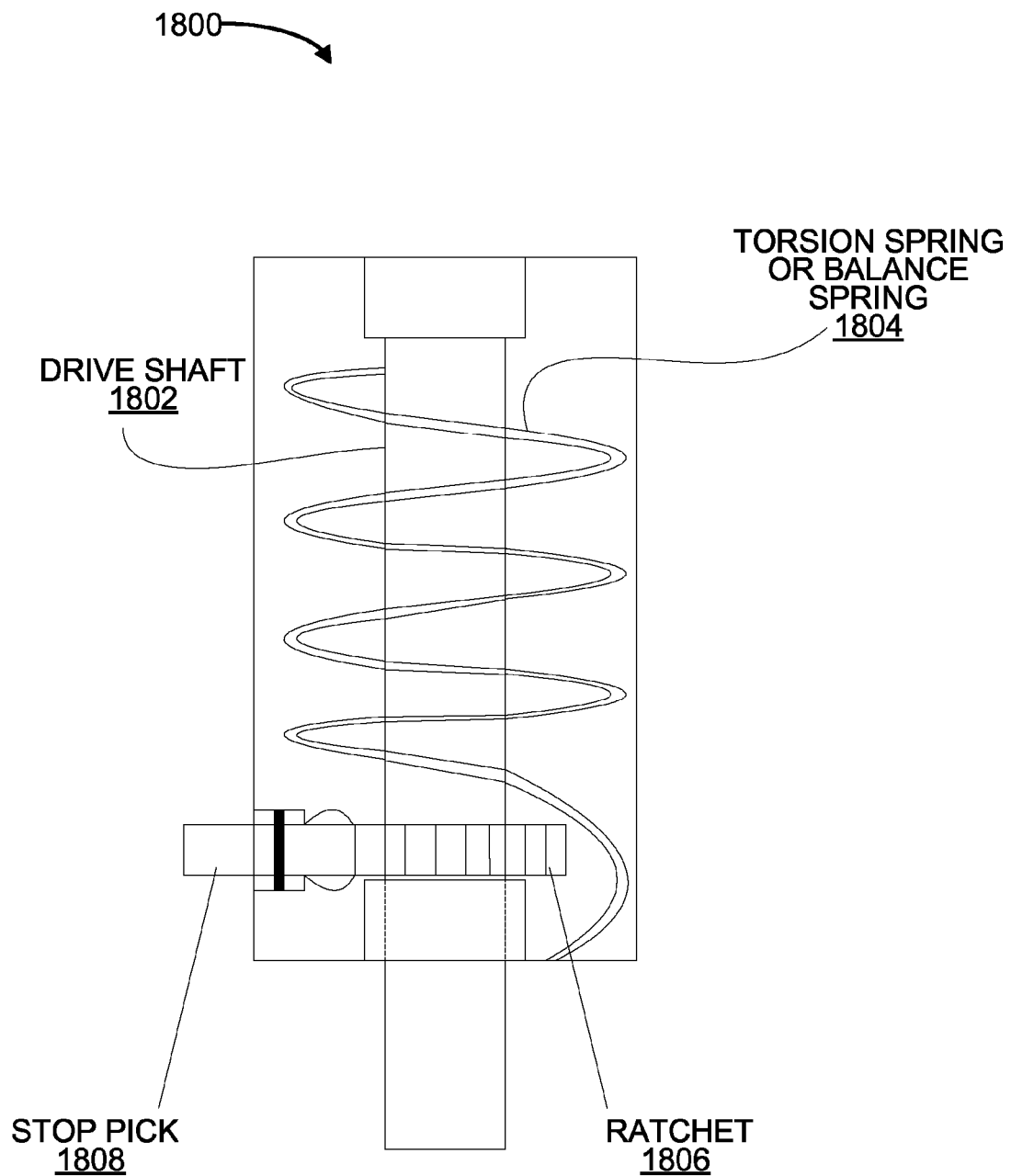
FIG. 18 is a side-view of a block diagram of a motor or other rotational means.

FIG. 18 is a side-view of a motor 1800 or other rotational means. Motor 1800 is one example of motor 510 in the above figures. Motor 1800 includes a drive shaft 1802 that extends through the motor 1800. Drive shaft 1802 is one example of motor drive shaft 508. Motor 1800 also includes a torsion spring or balanced spring 1804. The spring 1804 in some implementations is pre-compressed while on-site on a tank roof top just prior to use. The spring 1804 in some implementations is pre-compressed using a hand crank, a pneumatic crank or any other crank that would not create a spark or other ignition source. In other implementations the spring 1804 is pre-compressed off-site and away from the tank top or even the refinery in general, using any type of motorized crank such as an electric crank or a gas powered crank etc. The spring 1804 is operably coupled to a ratchet 1806 that rotates around the drive shaft 1802 and that includes a stop-pick 1808. When the stop-pick 1808 is disengaged from the ratchet 1806 by rotating the stop-pick 1808 outside the teeth of the ratchet 1806, the ratchet 1806 rotates freely, which allows the drive shaft 1802 to rotate freely under kinetic energy from the spring 1804.

Figure 19:
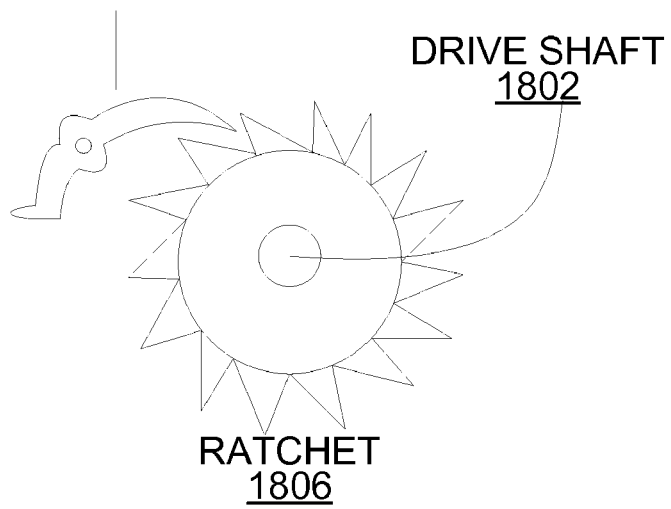
FIG. 19 is a top-view of a block diagram of a motor or other rotational means.

FIG. 19 is a top-view of a motor 1800 or other rotational means. Motor 1800 includes a drive shaft 1802 that extends through the motor 1800. Motor 1800 also includes a torsion spring or balanced spring 1804. The spring 1804 is operably coupled to a ratchet 1806 that rotates around the drive shaft 1802 and that includes a stop-pick 1808. When the stop-pick 1808 is disengaged from the ratchet 1806 by rotating the stop-pick 1808 outside the teeth of the ratchet 1806, the ratchet 1806 rotates freely, which allows the drive shaft 1802 to rotate freely under kinetic energy from the spring 1804.

Figure 20:
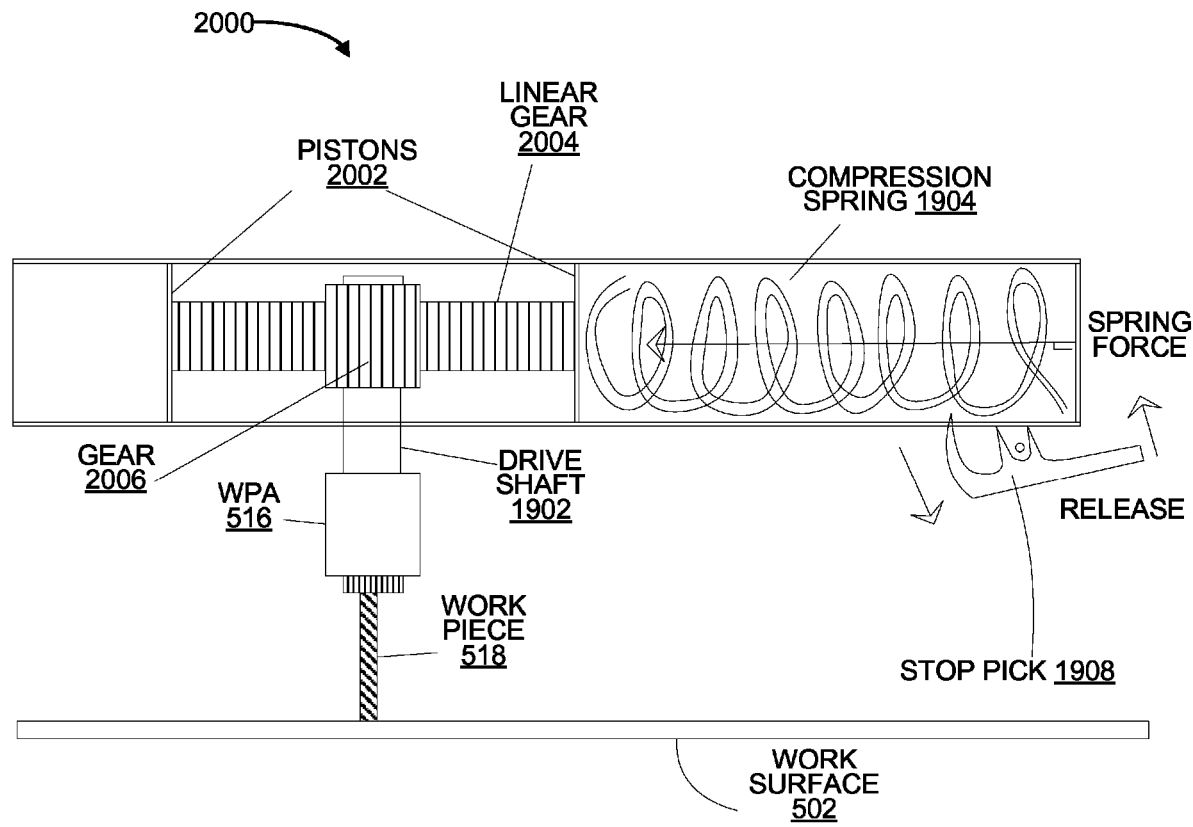
FIG. 20 is a motor or other rotational means.

FIG. 20 is a motor 2000 or other rotational means. Motor 2000 is one example of motor 510 in the above figures. Motor 2000 includes a drive shaft 1902 that extends through the motor 2000. Drive shaft 1902 is one example of motor drive shaft 508. Motor 2000 also includes a torsion spring or balanced spring 1904. The spring 1904 in some implementations is pre-compressed while on-site on a tank rooftop just prior to use. The spring 1904 in some implementations is pre-compressed using a hand press, a pneumatic press or any other press that would not create a spark or other ignition source. In other implementations the spring 1904 is pre-compressed off-site and away from the tank top or even away from the refinery in general, using any type of motorized press such as an electric press, a gas powered press etc. The spring 1904 is operably coupled to a stop-pick 1908. When the stop-pick 1908 is rotated outside the diameter of the spring 1904, the spring 1904 moves freely and releases tension on a piston 2002 and moves the piston 2002 that releases force on a linear gear 2004, that causes rotation of a gear 2006 that rotates the drive shaft 1902, which rotates a WPA 516, which rotates a work piece 518.

Figure 21:
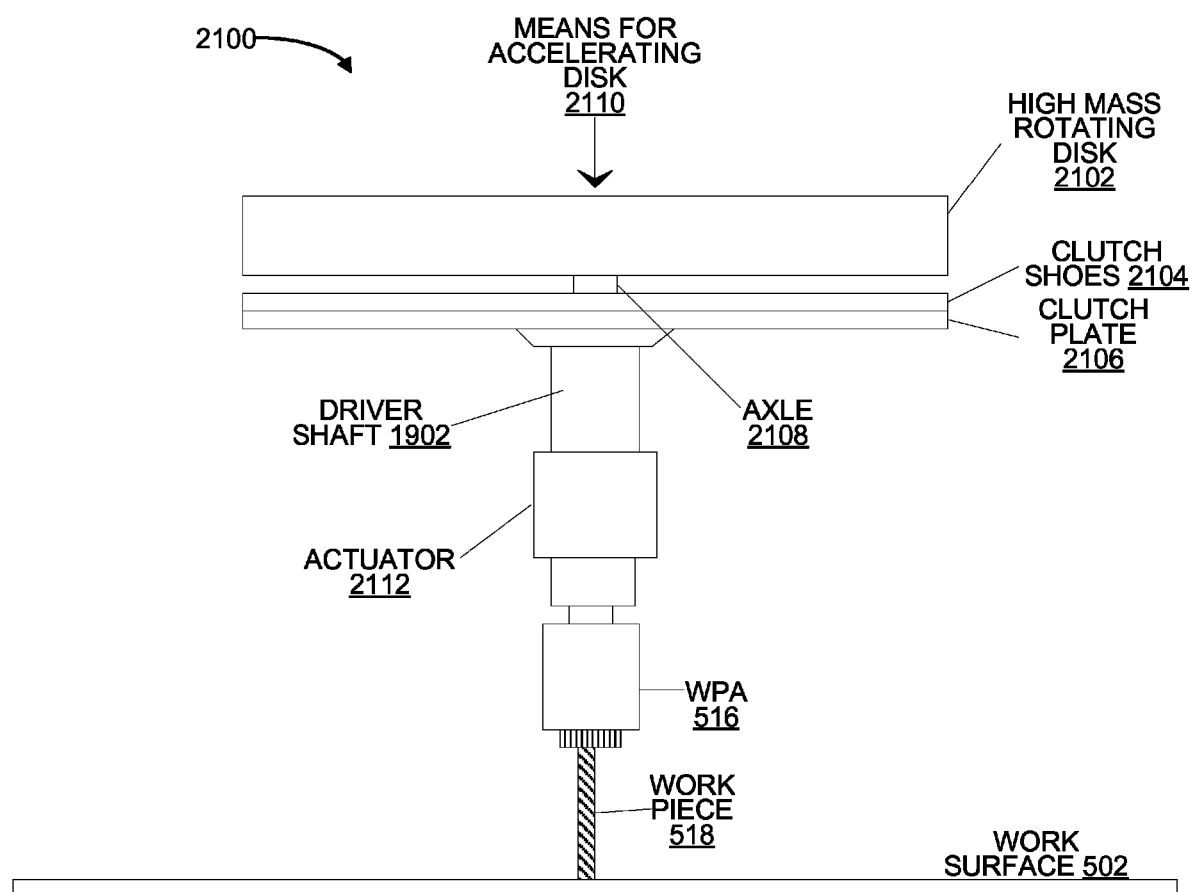
FIG. 21 is a motor or other rotational means.

FIG. 21 is a motor 2100 or other rotational means. Motor 2100 is one example of motor 510 in the above figures. Motor 2100 includes a drive shaft 1902. Drive shaft 1902 is one example of motor drive shaft 508. Motor 2100 also includes a high mass rotating disk 2102, clutch shoes 2104, and a clutch plate 2106 that are mounted on an axle 2108, the axle 2108 being fixedly attached to the drive shaft 1902. The axle 2108 allows the high mass rotating disk 2102 to spin when not in contact with the clutch shoes 2104. Rotation of the high mass rotating disk 2102 by a means for accelerating 2110 rotates the drive shaft 1902, which rotates an actuator 2112, which rotates a WPA 516 which rotates a work piece 518. The means for accelerating 2110 can be manual, a pneumatic motor or air pressure. When the high rotating disk 2102 is accelerated to a predetermined speed (such as 1000 rpm), the high mass rotating disk 2102 is positioned in contact with the clutch shoes 2104 and the energy from the high mass rotating disk 2102 is passed through the clutch plate 2106, the actuator 2112, the WPA 516, and to the work piece 518.

Figure 22:
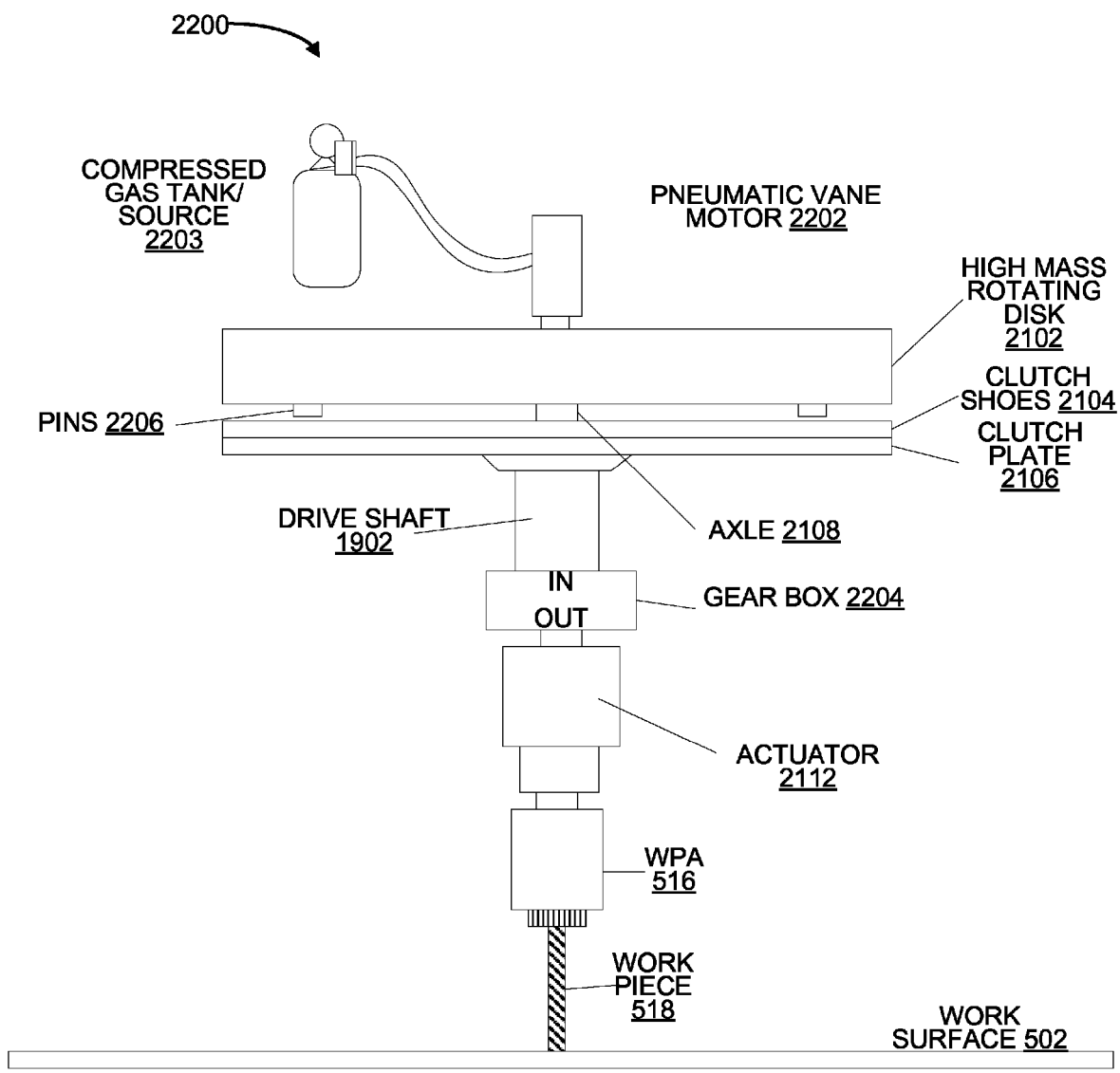
FIG. 22 is a motor or other rotational means.

FIG. 22 is a motor 2200 or other rotational means. Motor 2200 is one example of motor 510 in the above figures. Motor 2200 includes a drive shaft 1902. Drive shaft 1902 is one example of motor drive shaft 508. Motor 2200 also includes a high mass rotating disk 2102, clutch shoes 2104, and a clutch plate 2106 that are mounted on an axle 2108, the axle 2108 being fixedly attached to the drive shaft 1902. The axle 2108 allows the high mass rotating disk 2102 to spin when not in contact with the clutch shoes 2104. Rotation of the high mass rotating disk 2102 by powering a pneumatic vane motor 2202 rotates the drive shaft 1902, which rotates a gear box 2204, which rotates an actuator 2112, which rotates a WPA 516 which rotates a work piece 518. The gear box 2204 allows more kinetic energy to be stored in the motor 2200, because rotational kinetic energy is proportional to the square of the rotational speed. For example spinning the high mass rotating disk 2102 at 10,000 RPM and using a 10:1 gear box reduction allows 100 times the energy to be stored in the motor 2200 compared to spinning the high mass rotating disk 2102 at 1000 RPM without using a gear box, such as in motor 2100 in FIG. 21. The pneumatic vane motor 2202 is powered by gas from a compressed gas tank 2203. When the high rotating disk 2102 is accelerated to a predetermined speed (such as 1000 rpm), the high mass rotating disk 2102 is positioned in contact with the clutch shoes 2104 and the energy from the high mass rotating disk 2102 is passed through the clutch plate 2106, the drive shaft 1902, the gear box 2204, the actuator 2112, the WPA 516, and to the work piece 518. As an alternative, pins 2206 can be implemented instead of clutch plate 2106 to couple or lock plates together. A common requirement is approximately 20,000 joules of energy to weld a work piece 518.

Figure 23:
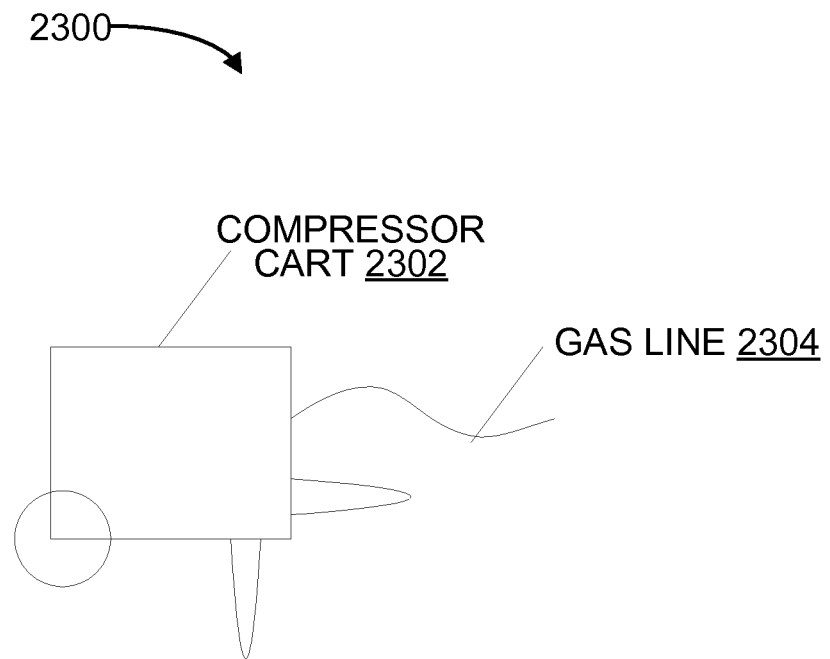
FIG. 23 is a pneumatic motor propulsion source.

FIG. 23 is a pneumatic motor propulsion source 2300. The pneumatic motor propulsion source 2300 is one example of a compressed gas tank 2203 in FIG. 22. The pneumatic motor propulsion source 2300 includes a wheeled cart 2302 that has an air compressor (not shown). A gas line 2304 couples the air compressor to a pneumatic vane motor, such as pneumatic vane motor 2202 in FIG. 22. As an alternative, a tank of compressed gas can be implemented instead of, or in addition to, the air compressor.

Figure 24:
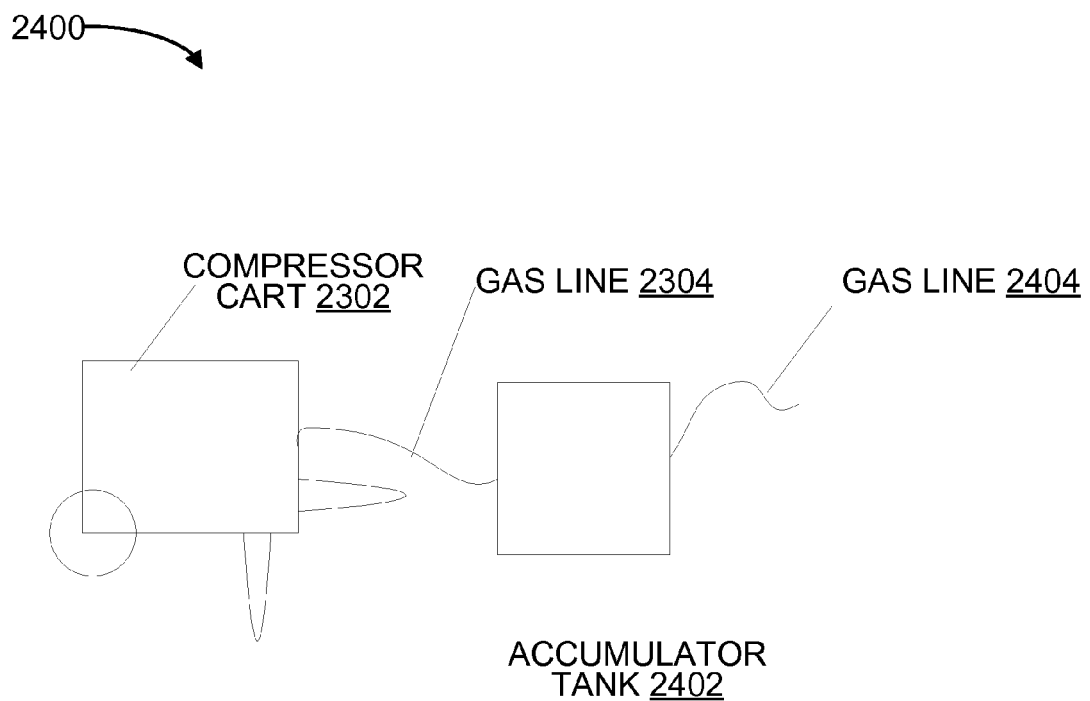
FIG. 24 is a pneumatic motor propulsion source.

FIG. 24 is a pneumatic motor propulsion source 2400. The pneumatic motor propulsion source 2300 is one example of a compressed gas tank 2203 in FIG. 22. The pneumatic motor propulsion source 2300 includes a wheeled cart 2302 that has an air compressor (not shown). A gas line 2304 couples the air compressor to a gas accumulator tank 2402 that is operably coupled to a second gas line 2404 that can be operably coupled to pneumatic vane motor, such as pneumatic vane motor 2202 in FIG. 22.

Figure 25:
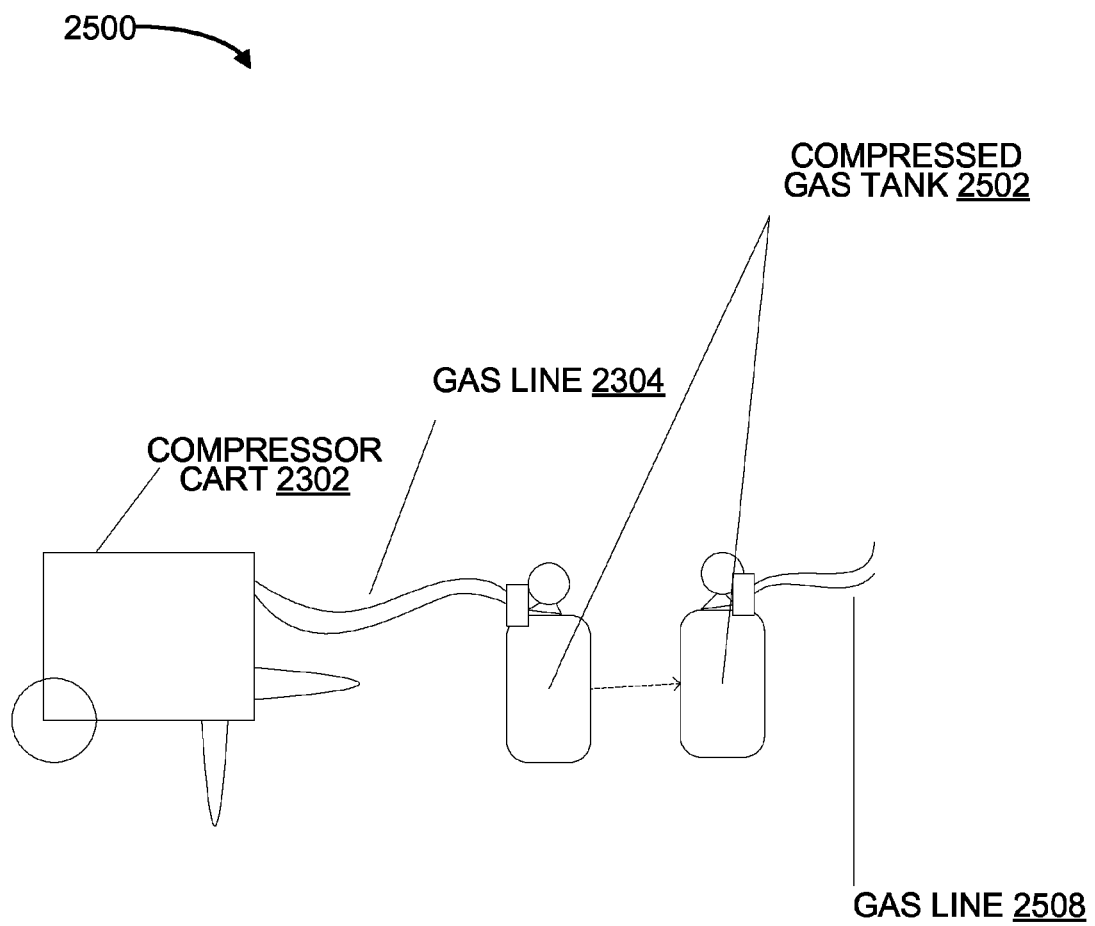
FIG. 25 is a pneumatic motor propulsion source.

FIG. 25 is a pneumatic motor propulsion source 2500. The pneumatic motor propulsion source 2500 is one example of a compressed gas tank 2203 in FIG. 22. The pneumatic motor propulsion source 2500 includes a wheeled cart 2302 that has an air compressor (not shown). A gas line 2304 couples the air compressor to a compressed gas tank 2502. The compressed gas tank 2502 can be decoupled from the gas line 2304, in which case the compressed gas tank 2502 can be coupled through gas line 2508 to a pneumatic vane motor, such as pneumatic vane motor 2202 in FIG. 22, friction welding apparatus 1500.

Figure 26:
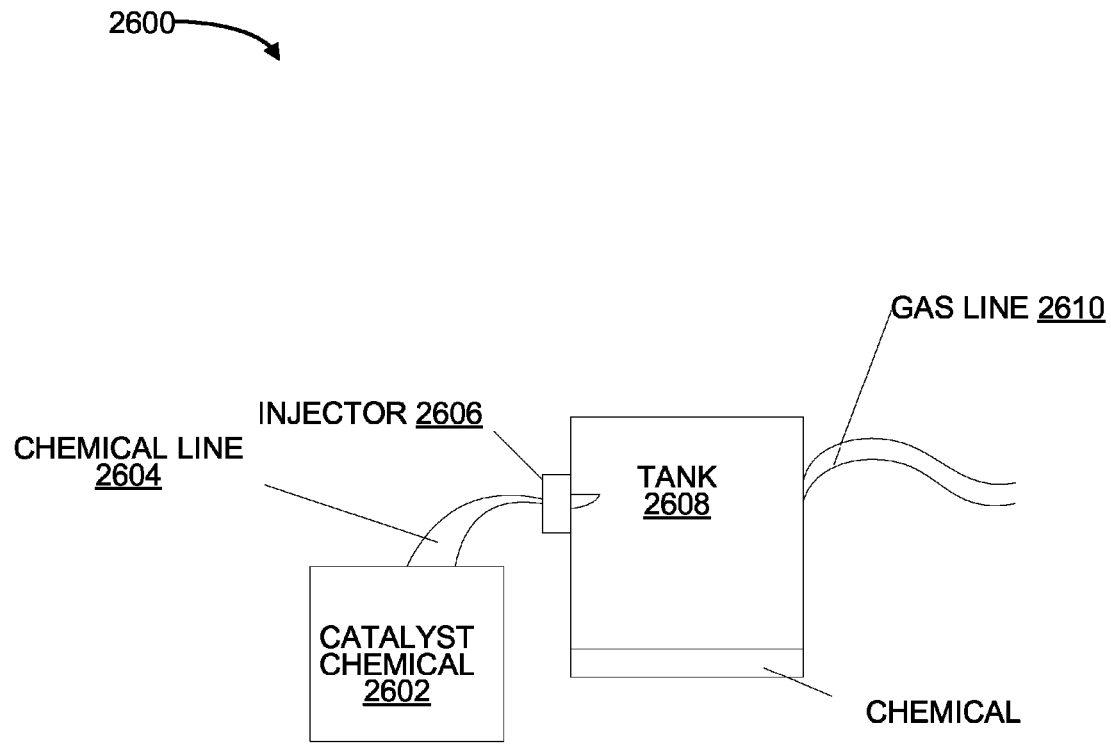
FIG. 26 is a pneumatic motor propulsion source.

FIG. 26 is a pneumatic motor propulsion source 2600. The pneumatic motor propulsion source 2600 is one example of a compressed gas tank 2203 in FIG. 22. The pneumatic motor propulsion source 2300 includes chemical catalyst tank 2602 in which a chemical reaction creates compressed gas which travels through a chemical line 2604 to an injector 2606 of a gas storage tank 2608. The gas storage tank 2608 is operably coupled to gas line 2610 that is operable to couple to a pneumatic vane motor, such as pneumatic vane motor 2202 in FIG. 22.

Figure 27:
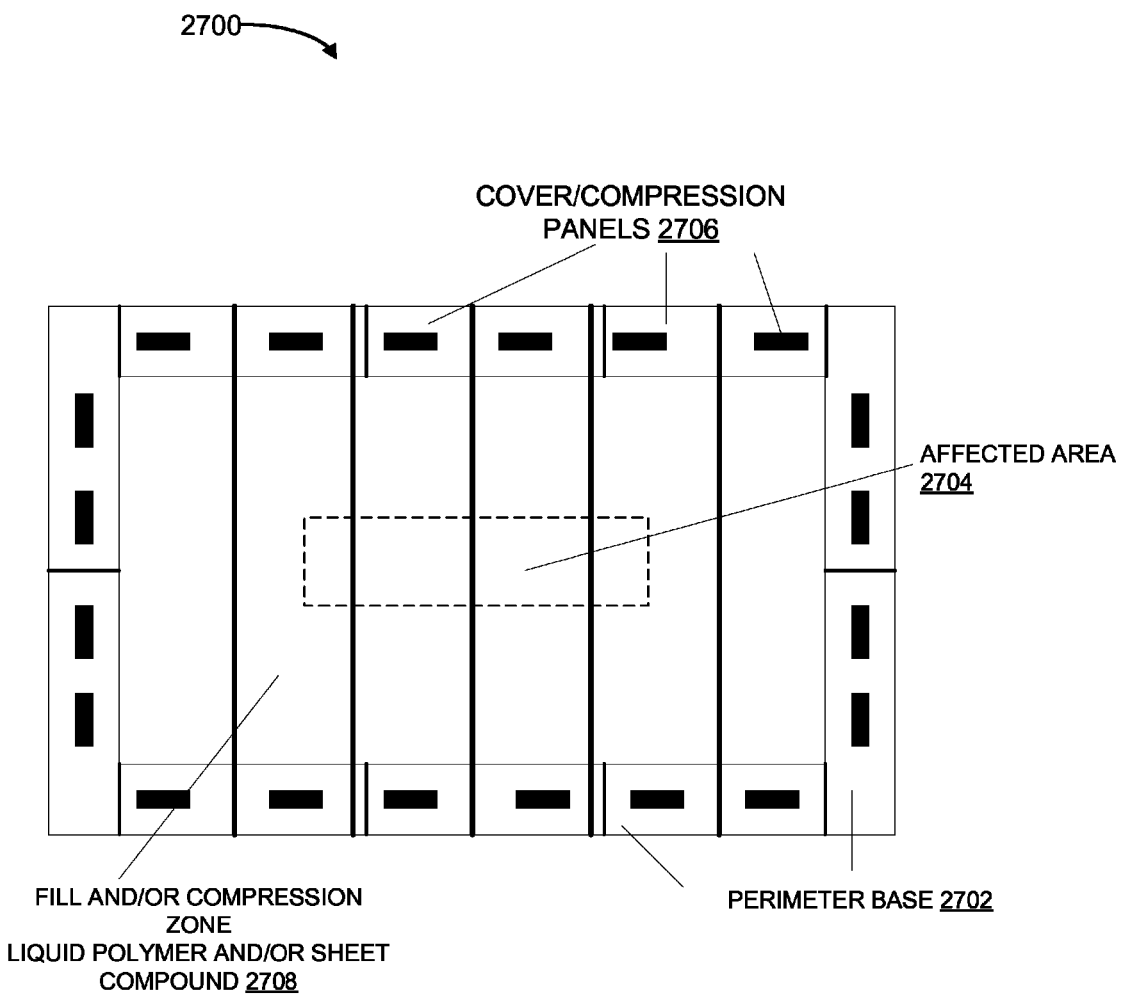
FIG. 27 is a top-view of a block diagram of a defect perimeter sealing system.

FIG. 27 is a top-view of a block diagram of a defect perimeter sealing system 2700. The defect perimeter sealing system 2700 has two particular capabilities. One capability is to provide fill around a defect and another capability is to provide live load compression. The defect perimeter sealing system 2700 includes a number of perimeter base components 2702 that are arranged around a defect 2704 of a tank. The entire top of the perimeter base components 2702 are encompassed or spanned by compression panels 2706. The area between the perimeter base components 2702, the surface of the defect 2704 and the compression panels 2706 is a field or compression zone 2708. A material is injected in the fill or compression zone 2708. One example of the injected material is a liquid polymer. Another example of the injected material is a sheet compound.

Figure 28:
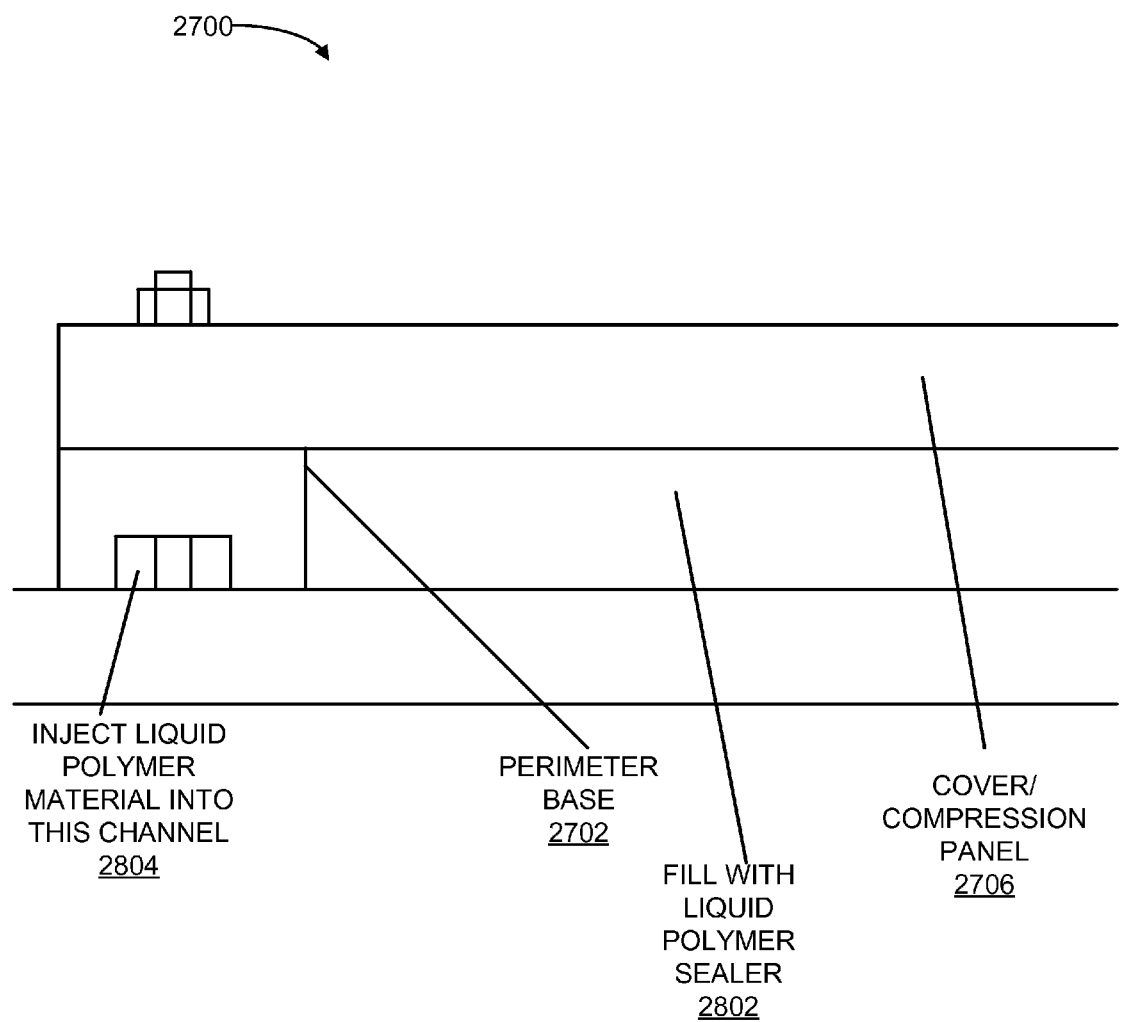
FIG. 28 is a cross-section side-view of a block diagram of a defect perimeter sealing system.

FIG. 28 is a cross-section side-view of a block diagram of a defect perimeter sealing system 2700. The defect perimeter sealing system 2700 has two particular capabilities. One capability is to provide fill around a defect in another capability is to provide live load compression. The defect perimeter sealing system 2700 includes a number of perimeter base components 2702 that are arranged around a defect (not shown in FIG. 28) of a tank. The entire top of the perimeter base components 2702 are encompassed or spanned by compression panels 2706. The area between the perimeter base components 2702, the surface of the defect and the compression panels 2706 is a field or compression zone 2802. A material is injected in the fill or compression zone 2802. One example of the injected material is a liquid polymer. Another example of the injected material is a sheet compound. In addition the perimeter base components 2702 also include a channel 2804 into which the material that is injected into the zone 2802 is also injected, or into which another material is injected.

Figure 29:
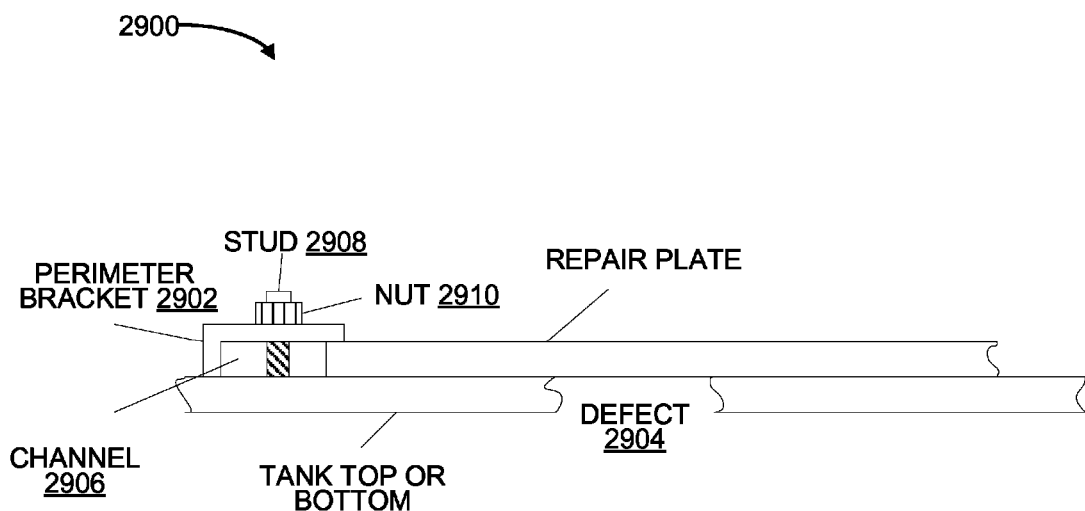
FIG. 29 is a cross-section side-view of a block diagram of a defect perimeter sealing system.

FIG. 29 is a cross-section side-view of a block diagram of a defect perimeter sealing system 2900. The defect perimeter sealing system 2900 provides live load compression. The defect perimeter sealing system 2900 includes a number of perimeter brackets 2902 that are arranged around a defect 2904 of a tank 2905. The entire top of the perimeter brackets 2902 are encompassed or spanned by repair plate. The repair plate is held in place by perimeter brackets 2902. In addition the perimeter brackets 2902 also include a channel 2906 into which a material such as a sealant is injected. Studs 2908 having nuts 2910 pass through the perimeter brackets 2902 and into the surface of the tank top or bottom, but not all the way through the tank top or bottom, to hold the perimeter brackets 2902 in place.

Figure 30:
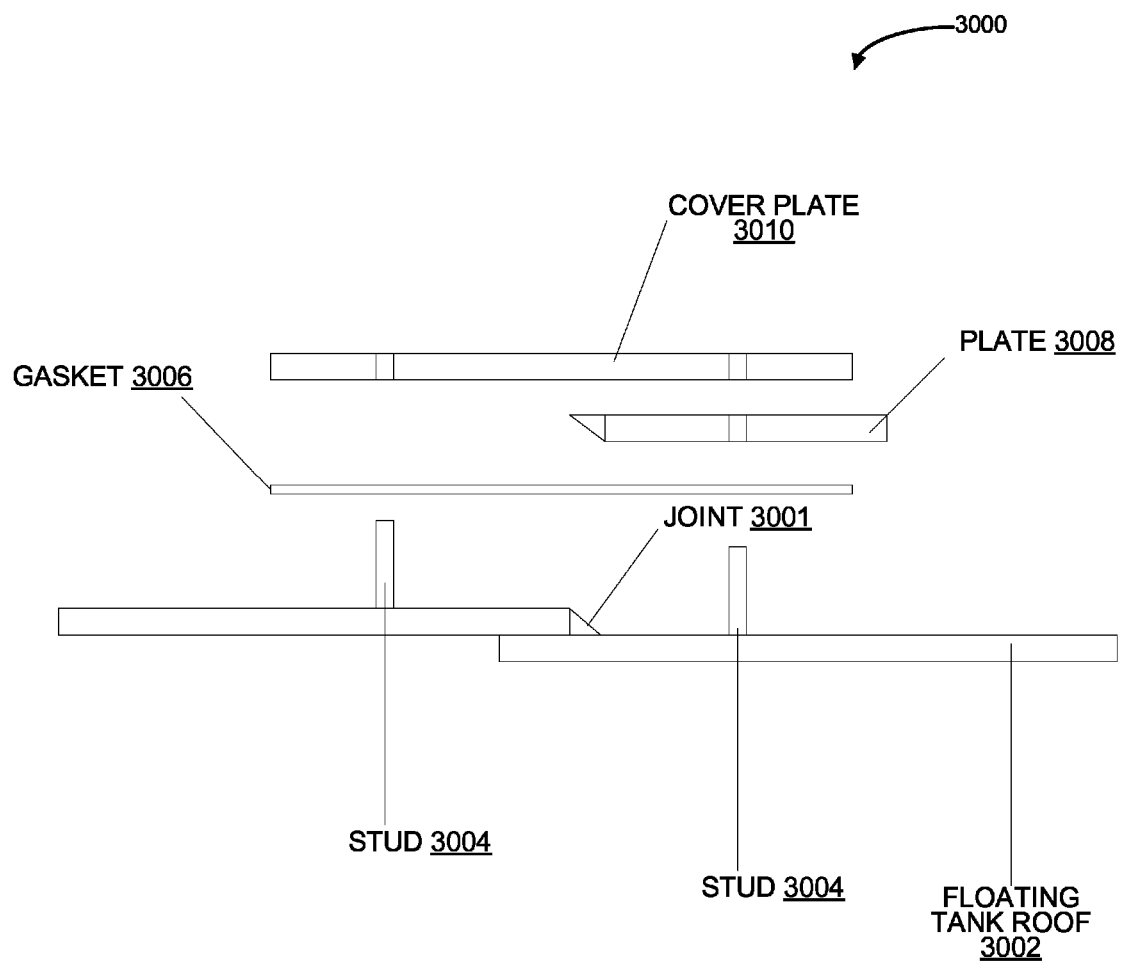
FIG. 30 is a side-view of a block diagram of a defect perimeter sealing system.

FIG. 30 is a side-view of a block diagram of a defect perimeter sealing system 3000. The defect perimeter sealing system 3000 provides live load compression. The defect perimeter sealing system 3000 is placed over a floating tank roof 3002 having a lap joint 3001. The lap joint 3001 is typically created during the original manufacture of the tank. The defect perimeter sealing system 3000 includes friction forged threaded studs 3004, at the least one of which is placed on the floating tank roof 3002. The defect perimeter sealing system 3000 also includes a flexible compression gasket 3006 that is placed over the top of the studs 3004. In some implementations, the studs 3004 have unequal lengths to the extent that tops of the studs are parallel with the plane of either portions of the floating tank roof 3002, so that when the flexible compression gasket 3006 is placed on top of the studs 3004 the flexible compression gasket 3006 is also parallel with the plane of either portions of the floating tank roof 3002. The perimeter sealing system 3000 also includes an offset compression plate 3008 that is placed on top of the flexible compression gasket 3006. The perimeter sealing system 3000 also includes a cover plate 3010 that is placed on top of the offset compression plate 3010. The perimeter sealing system 3000 is adapted to lap joints on tank roof tops.

Figure 31:
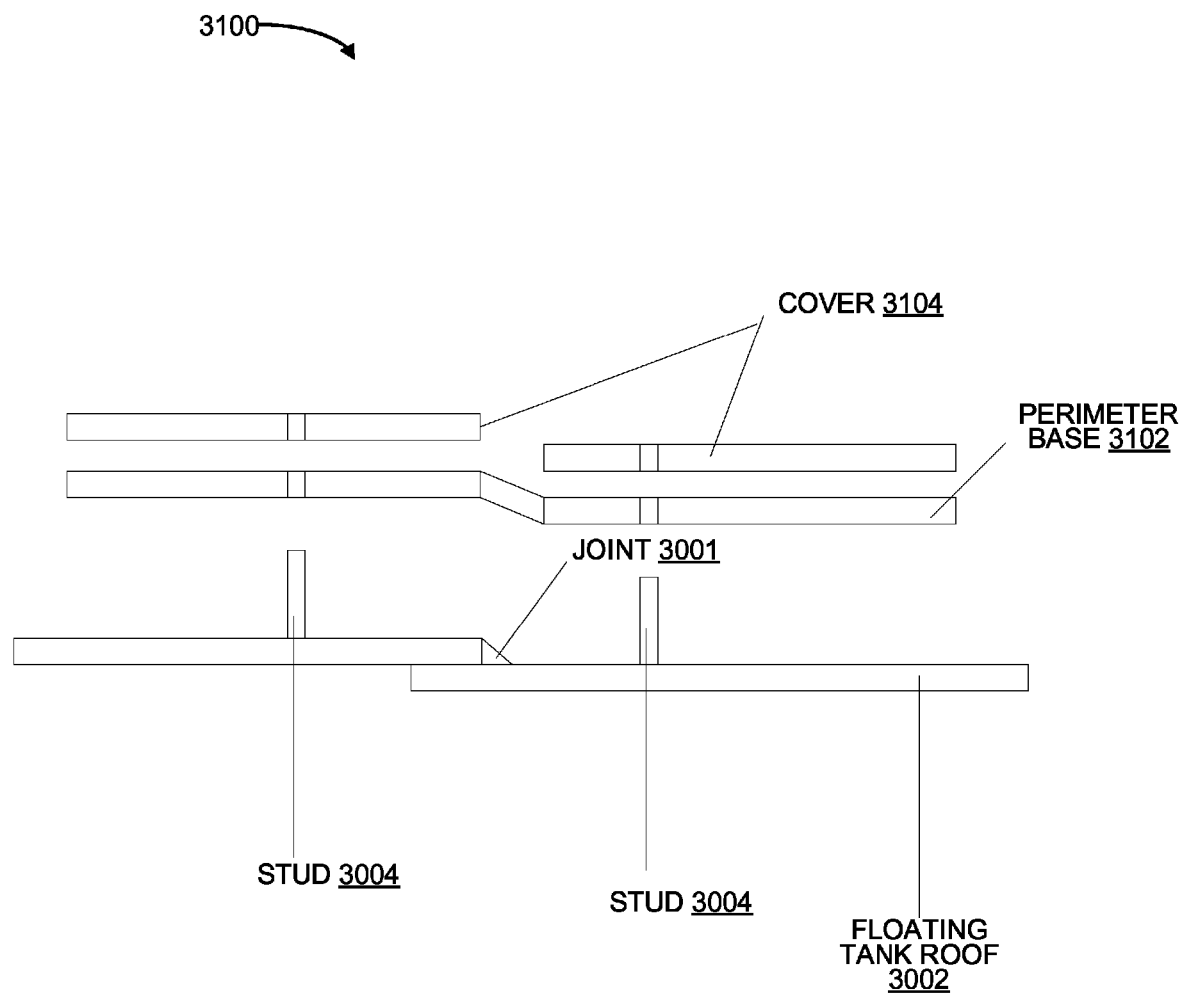
FIG. 31 is a side-view of a block diagram of a defect perimeter sealing system.

FIG. 31 is a side-view of a block diagram of a defect perimeter sealing system 3100. The defect perimeter sealing system 3100 provides live load compression. The defect perimeter sealing system 3100 is placed over a floating tank roof 3002 having a repair lap joint 3001. The defect perimeter sealing system 3100 includes friction forged threaded studs 3004, at the least one of which is placed on the floating tank roof 3002. The defect perimeter sealing system 3100 also includes a perimeter base 3102 that is placed over the top of the studs 3004. The studs 3004 have equal lengths so that tops of the studs are not parallel with the plane of either portions of the floating tank roof 3002, but the perimeter base 3102 includes an offset portion that is of equal offset to the lap joint 3001 so that when the perimeter base 3102 is placed on top of the studs 3004 the perimeter base 3102 is not parallel with the plane of either portions of the floating tank roof 3002. The perimeter sealing system 3100 also includes a cover 3104 that is placed on top of the perimeter base 3102. The perimeter sealing system 3100 is adapted to lap joints on tank roof tops.

Figure 32:
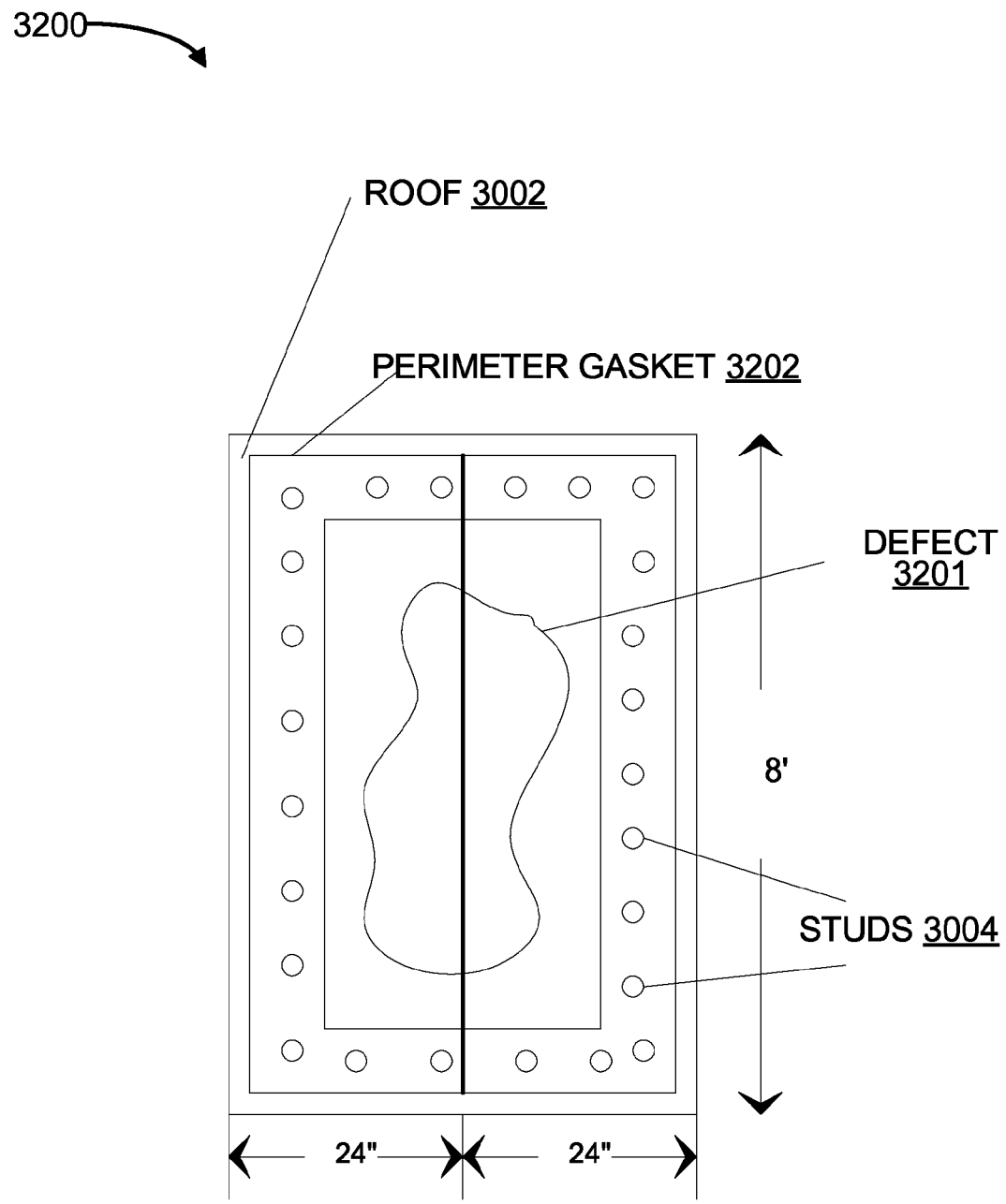
FIG. 32 is a top-view of a block diagram of a defect perimeter sealing system.

FIG. 32 is a top-view of a block diagram of a defect perimeter sealing system 3200. The defect perimeter sealing system 3200 provides live load compression. The defect perimeter sealing system 3200 is placed over a floating tank roof 3002 having a defect 3201. The defect perimeter sealing system 3200 includes a perimeter gasket 3202. The defect perimeter sealing system 3200 also includes studs 3004. The perimeter sealing system 3200 has the dimensions of 8 feet in length and 48 inches in width however the structure of the defect perimeter sealing system 3200 is not limited by those dimensions. The perimeter sealing system 3200 is adapted to lap joints on tank roof tops. Perimeter sealing system 3200 has long and narrow dimensions to fit through small 24"×36" manways in the walls of the tank.

Figure 33A:
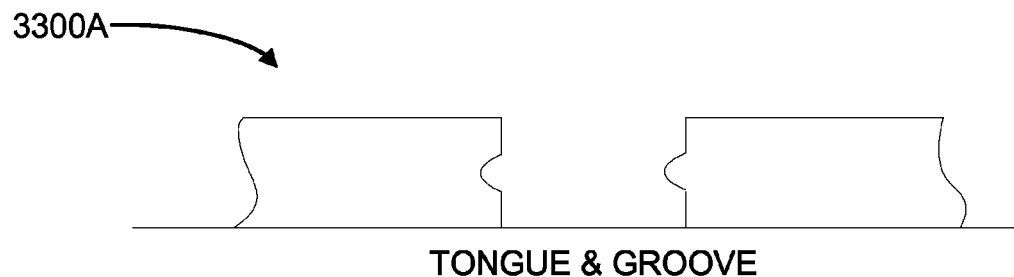
FIG. 33A is a side-view of a block diagram of interlocking sections of a perimeter gasket of a defect perimeter sealing system.

FIG. 33A is a side-view of a block diagram of interlocking sections 3300A of the perimeter base component 2702 or the compression panel 2706 of the defect perimeter sealing system 2700. The interlocking sections 3300A have a tongue and groove structure.

Figure 33B:
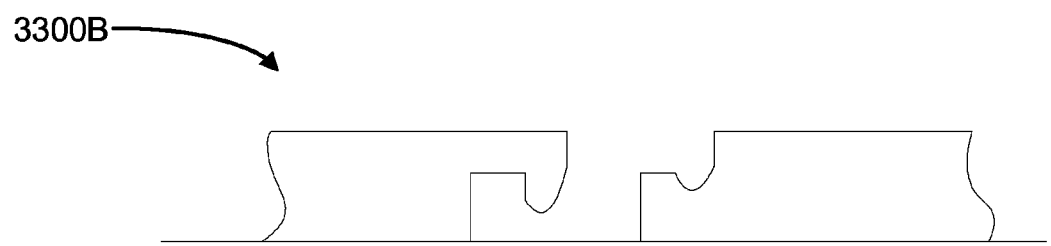
FIG. 33B is a side-view of a block diagram of interlocking sections of a perimeter gasket of a defect perimeter sealing system.

FIG. 33B is a side-view of a block diagram of interlocking sections 3300B of the perimeter base component 2702 or compression panel 2706 of the defect perimeter sealing system 2700. The interlocking sections 3300B have a cantilevered tongue and groove structure.

Figure 33C:
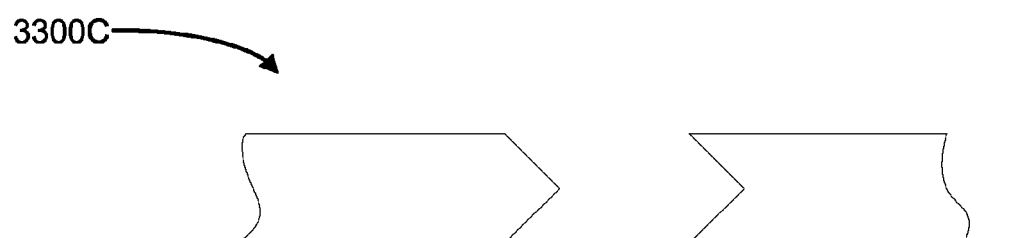
FIG. 33C is a side-view of a block diagram of interlocking sections of a perimeter gasket of a defect perimeter sealing system.

FIG. 33C is a side-view of a block diagram of interlocking sections 3300C of the perimeter base component 2702 or the compression panel 2706 of the defect perimeter sealing system 2700. The interlocking sections 3300C have a diagonal tongue and groove structure.

Figure 34:
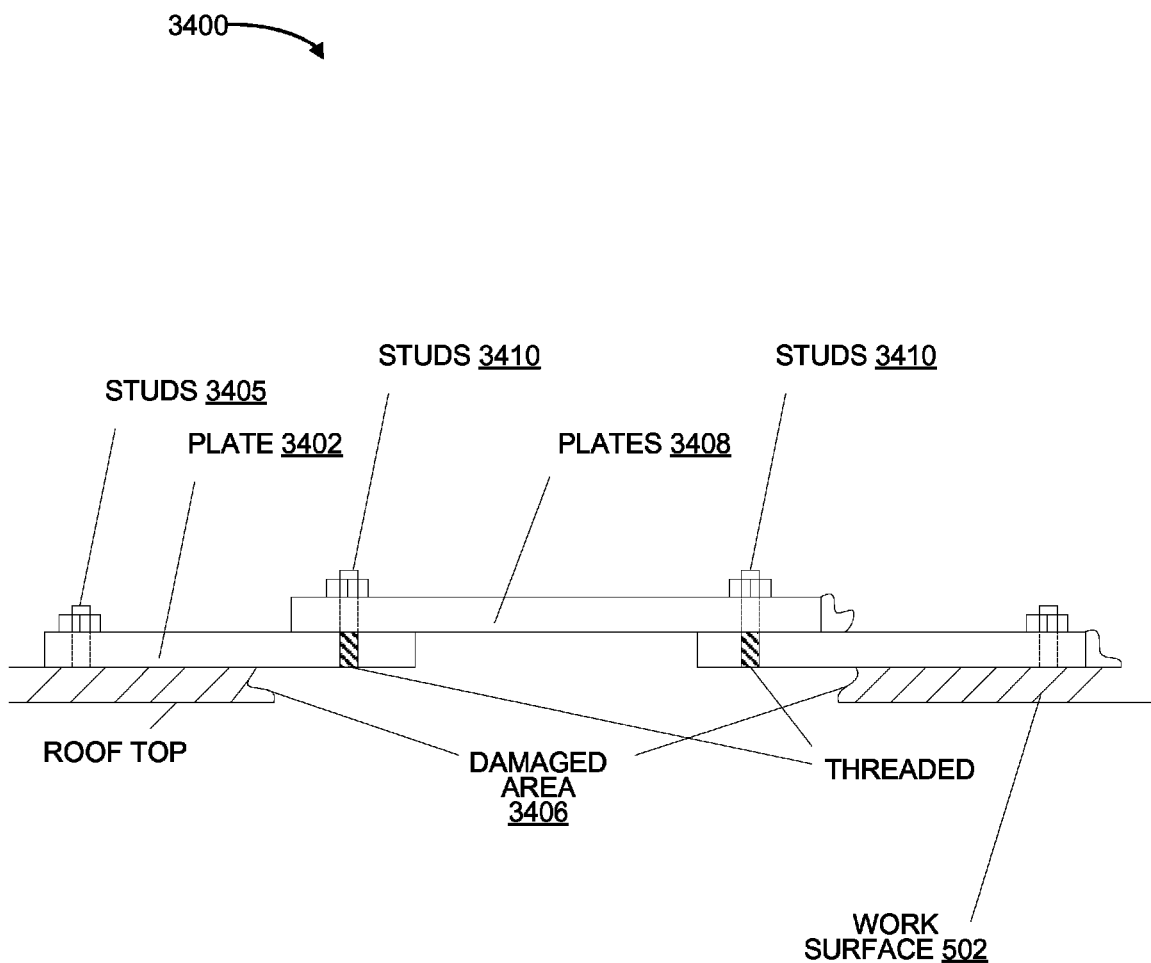
FIG. 34 is a cross-section side-view of a block diagram of a layered defect perimeter sealing system.

FIG. 34 is a cross-section side-view of a block diagram of a layered defect perimeter sealing system 3400. The layered defect-perimeter sealing system 3400 provides live load compression. The layered defect-perimeter sealing system 3400 includes a first layer plate 3402 that is secured by a stud 3405 to a work surface 502 around a damaged area 3406 of a tank roof top. The entire top of the first layer plate 3402 is encompassed or spanned by second layer plate 3408. The second layer plate 3408 is secured to the first layer plate 3402 via studs 3410.

Figure 35:
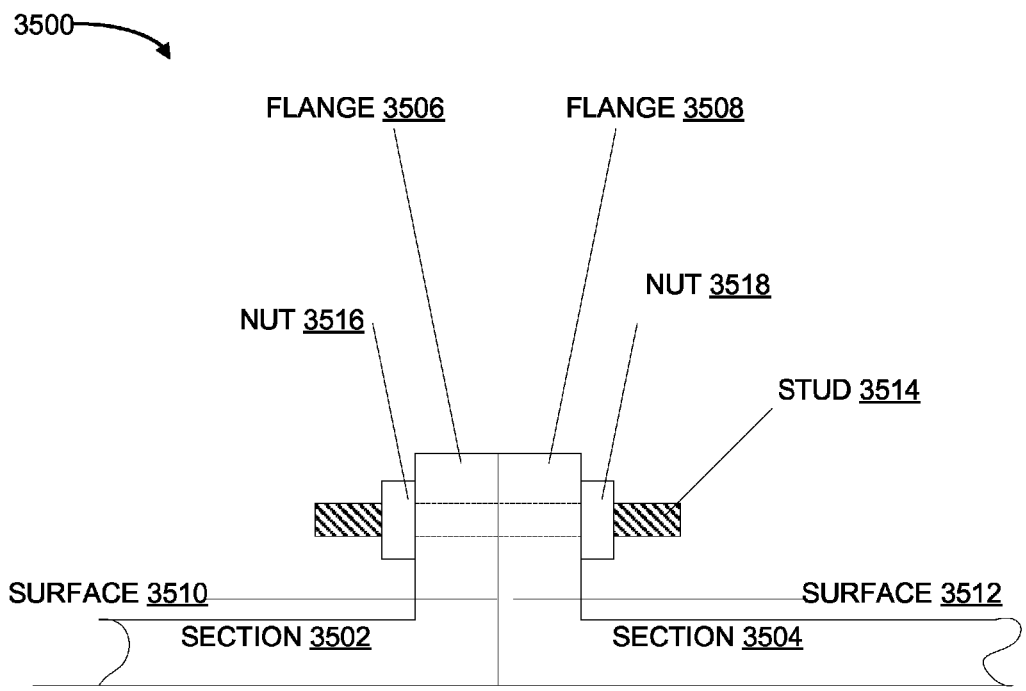
FIG. 35 is a side-view of a block diagram of interlocking sections of a perimeter gasket of a defect perimeter sealing system.

FIG. 35 is a side-view of a block diagram of interlocking sections 3500 of a cover/compression panels of a defect perimeter sealing system 3200. The interlocking sections 3502 and 3504 each have a vertical flange 3506 and 3508 with flat surfaces 3510 and 3512 through which a stud 3514 passes and is held secure by nuts 3516 and 3518.

Figure 36:
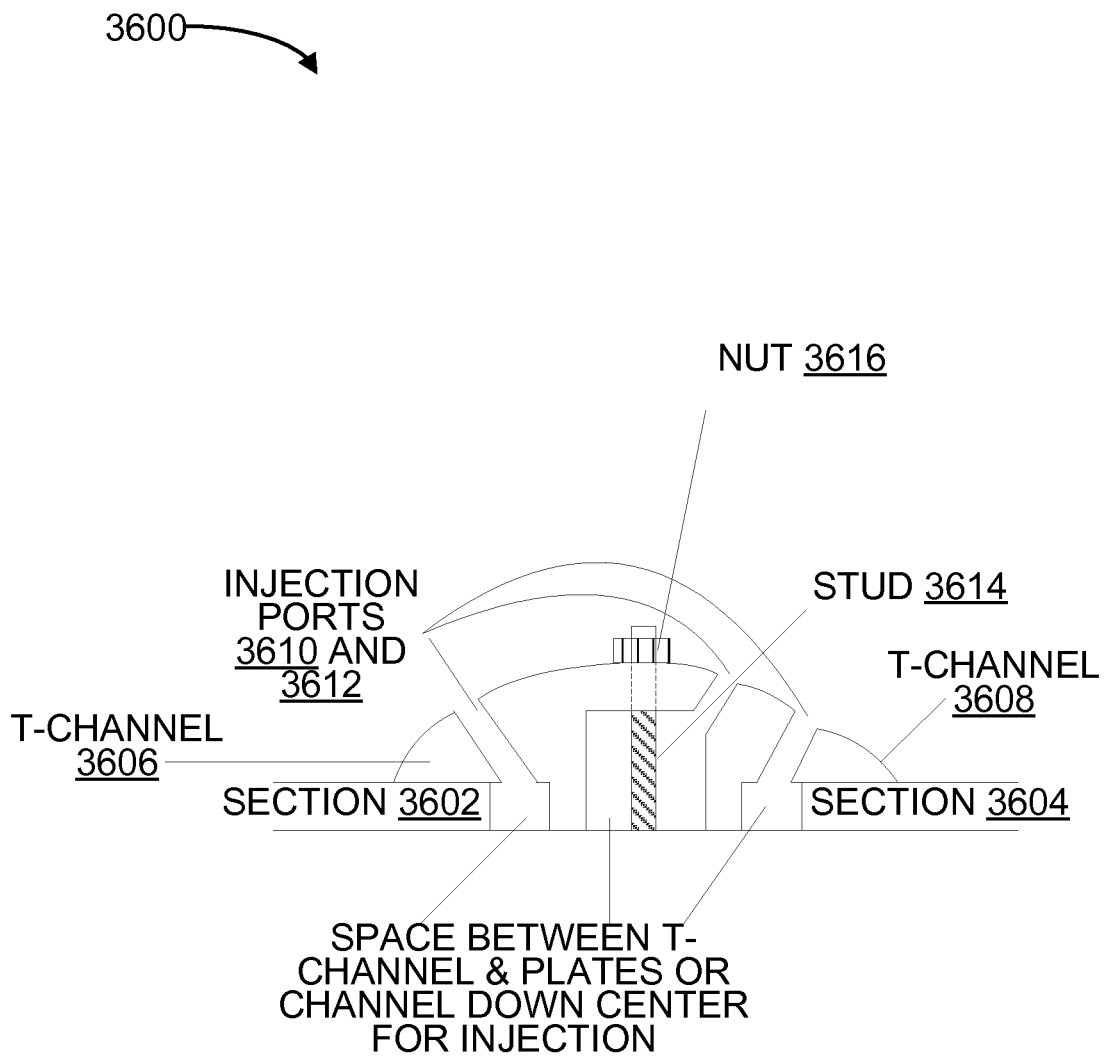
FIG. 36 is a side-view of a block diagram of T-channel interlocking sections of a perimeter gasket of a defect perimeter sealing system.

FIG. 36 is a side-view of a cross section block diagram of T-channel interlocking sections 3600 of a perimeter gasket of a defect perimeter sealing system 3200. The interlocking sections 3602 and 3604 each have a t-channel 3606 and 3608 with injection ports 3610 and 3612 through liquid polymer or other adhesive passes and is held secure by stud 3614 and nut 3516.

Figure 37:
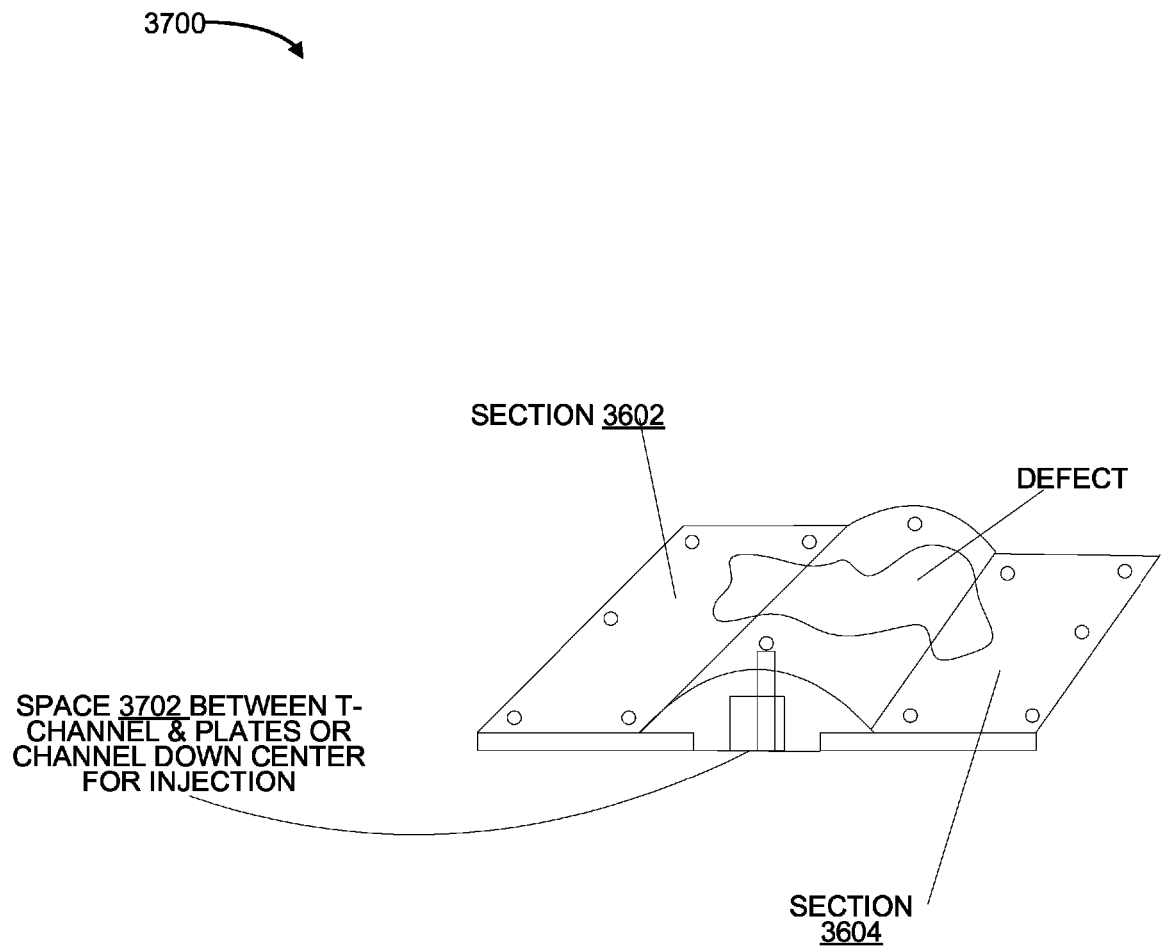
FIG. 37 is an isometric view of a block diagram of T-channel interlocking sections of a perimeter gasket of a defect perimeter sealing system.

FIG. 37 is an isometric view of a block diagram of T-channel interlocking sections 3600 of a perimeter gasket of a defect perimeter sealing system 3200. The interlocking sections 3602 and 3604 have a channel 3702 into which liquid polymer or other adhesive passes can be injected.

Figure 38:
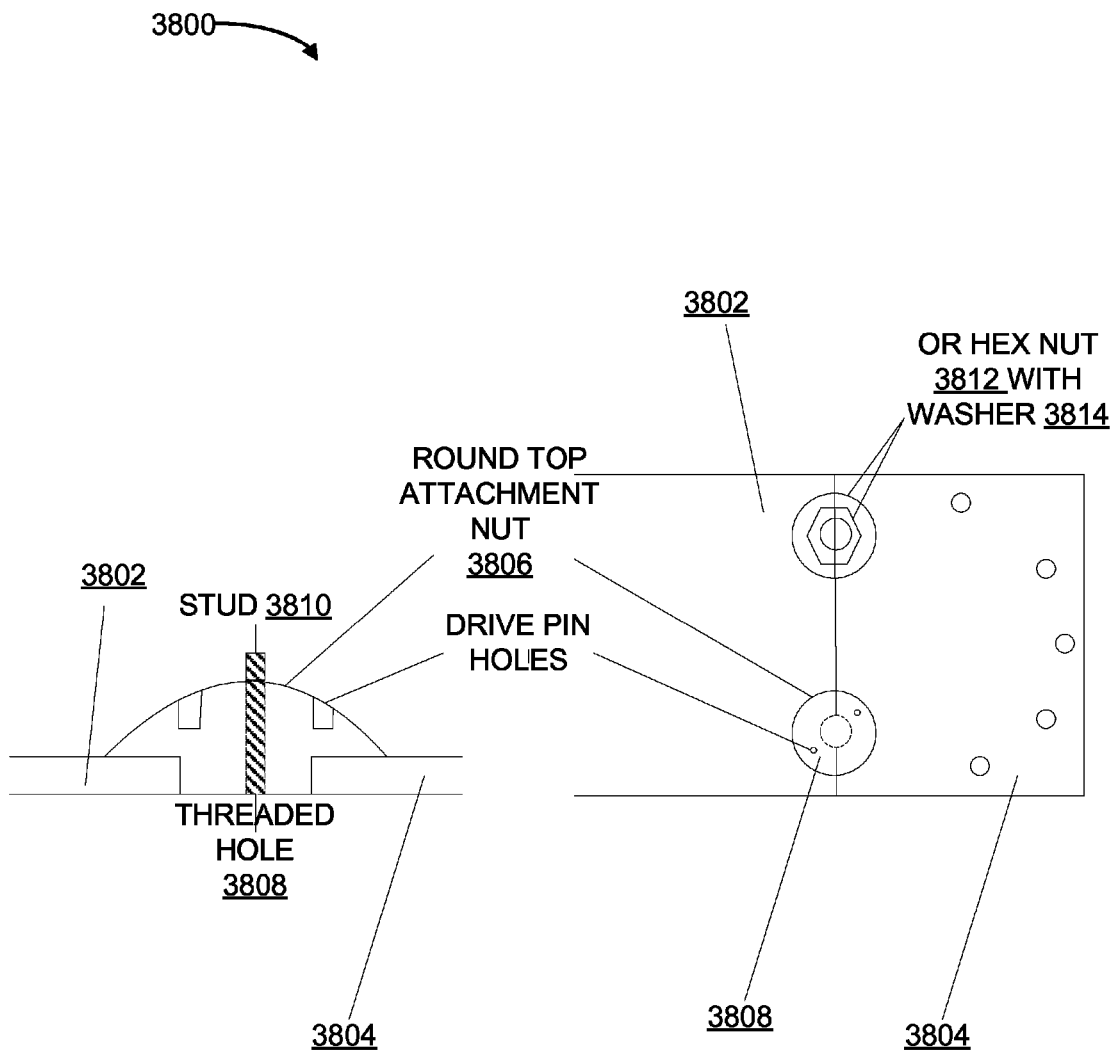
FIG. 38A is a cross-section side-view of a block diagram of sections of a perimeter gasket of a defect perimeter sealing system.
FIG. 38B is a top-view of a block diagram of sections of a perimeter gasket of a defect perimeter sealing system.

FIG. 38A is a cross-section side-view of a block diagram of sections 3800 of a perimeter gasket of a defect perimeter sealing system 3200. The sections 3802 and 3804 are positioned adjacent to a round top attachment nut 3806 having a threaded hole 3808 that is secured via a stud 3810.

FIG. 38B is a top-view of a block diagram of sections 3800 of a perimeter gasket of a defect perimeter sealing system 3200. The sections 3802 and 3804 are positioned adjacent to a round top attachment nut 3806 having a threaded hole 3808 that is secured via a stud 3810. In the alternative to the stud 3810 and the round top attachment nut 3806, a conventional hex nut 3812 with a washer 3814 can be implemented.

Figure 39:
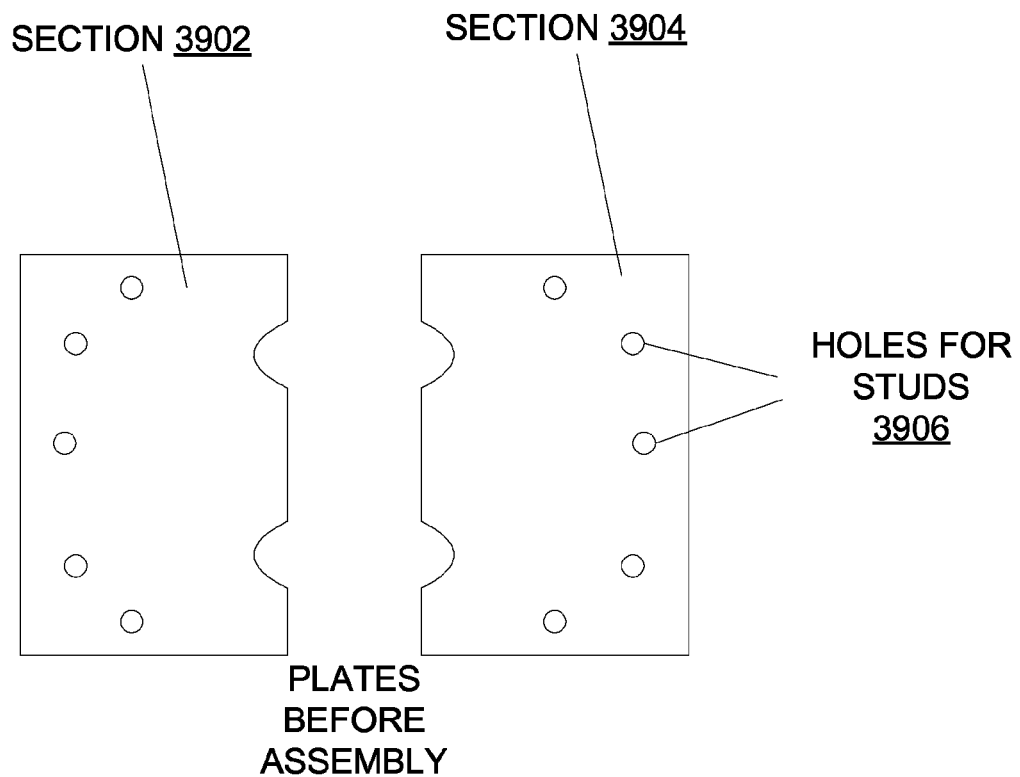
FIG. 39 is a top-view of a block diagram of sections of a perimeter gasket of a defect perimeter sealing system.

FIG. 39 is a top-view of a block diagram of sections 3900 of a perimeter gasket of a defect perimeter sealing system 3200. The sections 3902 and 3904 have holes 3906 for studs.

Figure 40:
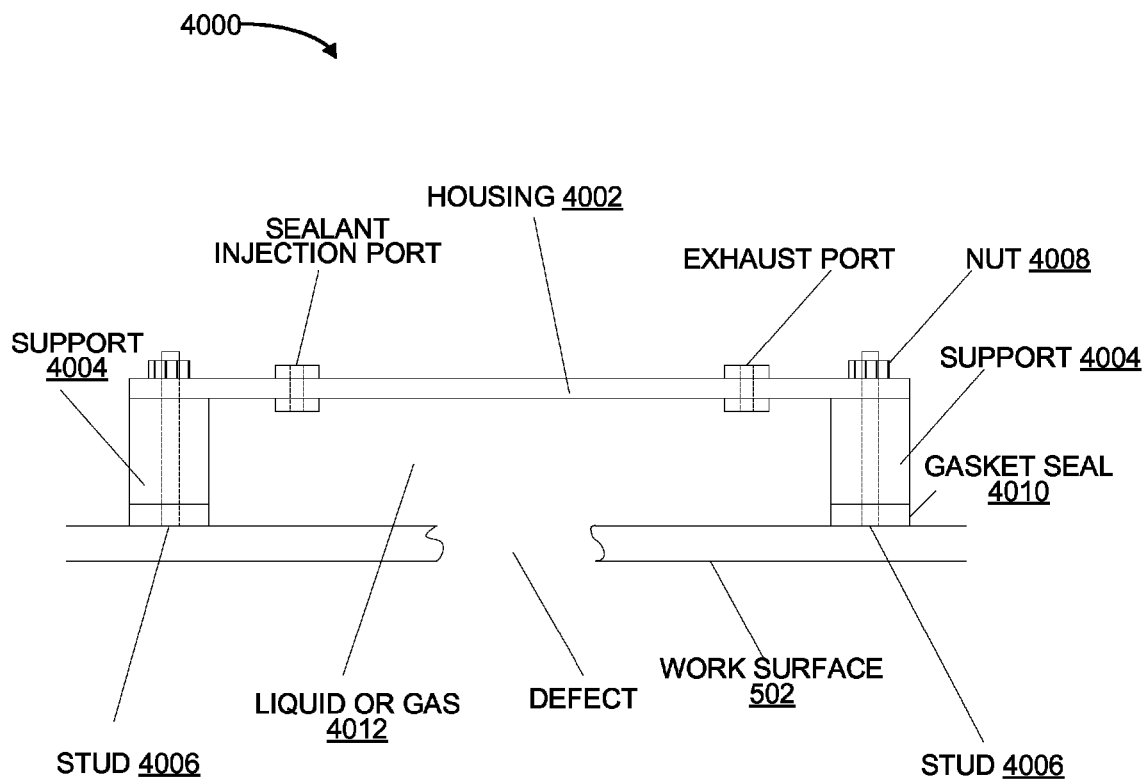
FIG. 40 is a side-view of a cross section block diagram of a friction welding apparatus.

FIG. 40 is a side-view of a cross section block diagram of a friction welding apparatus 4000. The friction welding apparatus 4000 is positioned over a work surface 502 such as deck 102 in FIG. 1. The friction welding apparatus 4000 includes a housing 4002 that is secured to the work surface 502 through a number of supports 4004 between the work surface 502 and the housing 4002, the supports 4004 including a stud 4006 and a nut 4008. The supports 4004 also include a gasket seal 4010 between the support 4004 and the work surface 502. Inert gas 4012 can be released into the chamber formed by the work surface 502 is supports 4004 and the housing 4002 the actuator 512, thus preventing combustion in the vicinity of the tank.

Figure 41:
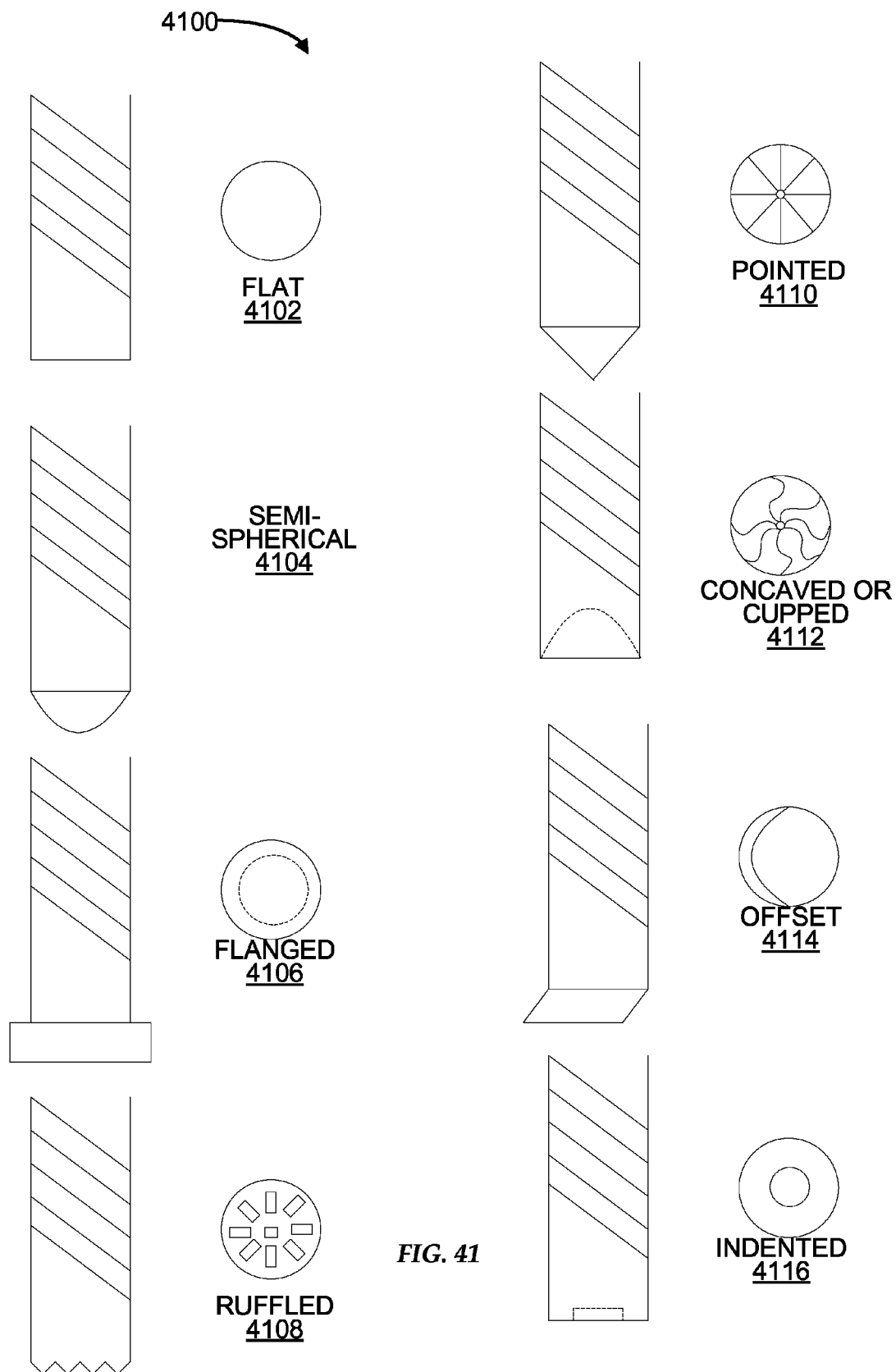
FIG. 41 illustrates eight different stud geometries.

FIG. 41 illustrates eight different stud geometries 4100, such as such as a flat-end stud 4102, a semi-spherical-end stud 4104, a flanged-end stud 4106, a ruffled-end stud 4108, a pointed-end stud 4110, a concave or cupped-end stud 4112, and offset-end stud 4114 and an indented-end stud 4116.

The techniques and apparatus of the drawings and detailed description can be implemented in the energy industry in petrochemical, oil and gas, nuclear, coal and gas power plants, solar and wind, hydro-electric and transportation of energy products by rail, truck, ships, pipeline and air; the drawings and detailed description can be implemented in the construction of buildings, bridges and towers; the drawings and detailed description can be implemented in marine construction of ships, commercial and military, submarines, tankers and barges at ship yards, docks, offshore and semisubmersibles; and the drawings and detailed description can be implemented in mining, underground, agriculture, grain storage and aviation and space.

The techniques and apparatus of the drawings and detailed description can be implemented in internal floor applications in which as extended hose for internal use, 24" to 36" max manway's, wherein the procedure for roof repair and internal repair is the same and if larger patches were needed a hole could be cut in the roof to install.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The numerous innovative teachings of the present application will be described with particular reference to the exemplary embodiments. However, it should be understood that this class of embodiments provides only a few examples of the many advantageous uses of the innovative teachings herein. In general, statements made in the specification of the present application do not necessarily limit any of the various claimed inventions. To the contrary, the description of the exemplary embodiments are intended to cover alternative, modifications, and equivalents as may be included within the spirit and scope of the invention as defined by the claims. Moreover, some statements may apply to some inventive features but not to others.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

The invention claimed is:

1. A defect perimeter sealing system comprising:
a plurality of perimeter base components that are arranged around a defect of a tank, where all of a top of the plurality of perimeter base components are encompassed or spanned by a plurality of compression panels, the plurality of perimeter base components and the plurality of compression panels defining a fill zone between the plurality of perimeter base components and the plurality of compression panels; and
an injected material in the fill zone.

2. The defect perimeter sealing system of claim 1, wherein the injected material further comprises:
a liquid polymer.

3. The defect perimeter sealing system of claim 1, wherein each of the plurality of compression panels further comprises:
a tongue and groove interlocking structure.

4. The defect perimeter sealing system of claim 1 further comprising:
a geometry that fits through manways in walls of a tank, the tank in a vicinity of a hazardous material.

5. The defect perimeter sealing system of claim 1 wherein each of the plurality of perimeter base components further comprises:
an interlocking structure.

6. The defect perimeter sealing system of claim 1 wherein each of the plurality of perimeter base components further comprises:
an interlocking section that further comprises a vertical flange and with flat surfaces through which a stud passes and is held secure by nuts.

7. The defect perimeter sealing system of claim 1, wherein the plurality of compression panels further comprises:
a single compression panel.

8. The defect perimeter sealing system of claim 7, wherein the single compression panel further comprises:
a gasket seal.

9. The defect perimeter sealing system of claim 1, wherein the plurality of perimeter base components further comprises:
a single perimeter base component.

10. The defect perimeter sealing system of claim 9, wherein the single perimeter base component further comprises:
a housing.

* * * * *